US012400519B2

(12) United States Patent
Palmisano et al.

(10) Patent No.: US 12,400,519 B2
(45) Date of Patent: Aug. 26, 2025

(54) SYSTEMS AND METHODS FOR PROVIDING DYNAMIC REWARDS

(71) Applicant: Aristocrat Technologies, Inc., Las Vegas, NV (US)

(72) Inventors: Angelo Palmisano, Henderson, NV (US); Jennifer Andrea Potokar, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/425,551

(22) Filed: Jan. 29, 2024

(65) Prior Publication Data

US 2024/0169799 A1 May 23, 2024

Related U.S. Application Data

(63) Continuation of application No. 18/058,618, filed on Nov. 23, 2022, now Pat. No. 11,928,930, which is a
(Continued)

(51) Int. Cl.
*G06Q 30/00* (2023.01)
*G06Q 30/0207* (2023.01)
(Continued)

(52) U.S. Cl.
CPC ..... *G07F 17/3255* (2013.01); *G06Q 30/0209* (2013.01); *G06Q 30/0215* (2013.01);
(Continued)

(58) Field of Classification Search
None
See application file for complete search history.

(56) References Cited

U.S. PATENT DOCUMENTS

| D259,499 S | 6/1981 | Dunham |
| 5,342,518 A | 8/1994 | Posner |

(Continued)

FOREIGN PATENT DOCUMENTS

| AU | 630112 B | 3/1993 |
| AU | 1997022551 A1 | 8/1997 |

(Continued)

OTHER PUBLICATIONS

Shopkick Rewards Visa Cardholders When and Where they Shop, Publication info: Business Wire Nov. 21, 2011. (Year: 2011).*

(Continued)

*Primary Examiner* — Matthew T Sittner
(74) *Attorney, Agent, or Firm* — Armstrong Teasdale LLP

(57) ABSTRACT

A loyalty program management system associated with an enterprise location is provided. The loyalty program management system is programmed to: a) receive a plurality of input data associated with a plurality of patrons, wherein the plurality of input data represents actions of the plurality of patrons; b) determine a current location of a patron of the plurality of patrons, wherein the current location of the patron is not at the enterprise location; and c) transmit a message to a computer device associated with the patron including a prize to be awarded if the patron visits the enterprise location.

20 Claims, 5 Drawing Sheets

Related U.S. Application Data continuation of application No. 17/058,548, filed as application No. PCT/US2019/053407 on Sep. 27, 2019, now Pat. No. 11,521,462.

(60) Provisional application No. 62/741,726, filed on Oct. 5, 2018.

(51) Int. Cl.
*G06Q 30/0226* (2023.01)
*G06Q 30/0251* (2023.01)
*G06Q 50/34* (2012.01)
*G07F 17/32* (2006.01)

(52) U.S. Cl.
CPC ..... *G06Q 30/0231* (2013.01); *G06Q 30/0233* (2013.01); *G06Q 30/0261* (2013.01); *G06Q 30/0271* (2013.01); *G06Q 50/34* (2013.01); *G07F 17/323* (2013.01); *G07F 17/3239* (2013.01)

(56) References Cited

U.S. PATENT DOCUMENTS

| | | |
|---|---|---|
| 5,560,603 A | 10/1996 | Seelig |
| 5,664,998 A | 9/1997 | Seelig |
| 5,755,621 A | 5/1998 | Marks |
| 5,767,854 A | 6/1998 | Anwar |
| 5,779,242 A | 7/1998 | Kaufmann |
| 5,779,549 A | 7/1998 | Walker |
| 6,039,648 A | 3/2000 | Guinn |
| 6,082,887 A | 7/2000 | Feuer |
| 6,093,100 A | 7/2000 | Singer |
| 6,210,275 B1 | 4/2001 | Olsen |
| 6,224,486 B1 | 5/2001 | Walker |
| 6,270,412 B1 | 8/2001 | Crawford |
| 6,287,202 B1 | 9/2001 | Pascal |
| 6,293,865 B1 | 9/2001 | Kelly |
| 6,309,299 B1 | 10/2001 | Weiss |
| 6,354,592 B1 | 3/2002 | Mrzi |
| 6,425,828 B2 | 7/2002 | Walker |
| 6,620,045 B2 | 9/2003 | Berman |
| D492,692 S | 7/2004 | Fallon |
| 6,817,948 B2 | 11/2004 | Pascal |
| D499,786 S | 12/2004 | Dropo |
| 6,908,390 B2 | 6/2005 | Nguyen |
| 7,354,345 B2 | 4/2008 | Bortnik |
| 7,393,280 B2 | 7/2008 | Cannon |
| 7,516,959 B2 | 4/2009 | Huard |
| D605,725 S | 12/2009 | Chang |
| 7,682,251 B2 | 3/2010 | Bortnik |
| 7,684,874 B2 | 3/2010 | Schlottmann |
| 7,684,882 B2 | 3/2010 | Baerlocher |
| 7,689,302 B2 | 3/2010 | Schlottmann |
| 7,690,996 B2 | 4/2010 | Iddings |
| 7,704,144 B2 | 4/2010 | Abbott |
| 7,753,790 B2 | 7/2010 | Nguyen |
| 7,780,520 B2 | 8/2010 | Baerlocher |
| 7,787,972 B2 | 8/2010 | Schlottmann |
| 7,798,901 B2 | 9/2010 | Nguyen |
| 7,824,267 B2 | 11/2010 | Cannon |
| 7,878,899 B2 | 2/2011 | Duhamel |
| 7,972,209 B2 | 7/2011 | Kelly |
| 7,976,389 B2 | 7/2011 | Cannon |
| 8,002,630 B2 | 8/2011 | Nguyen |
| 8,021,230 B2 | 9/2011 | Baerlocher |
| 8,043,157 B2 | 10/2011 | Cannon |
| 8,070,583 B2 | 12/2011 | Baerlocher |
| 8,092,309 B2 | 1/2012 | Bickley |
| 8,142,272 B2 | 3/2012 | Walker |
| 8,157,647 B2 | 4/2012 | House |
| 8,192,270 B2 | 6/2012 | Slomiany |
| 8,202,165 B2 | 6/2012 | Duhamel |
| 8,246,434 B2 | 8/2012 | Moody |
| 8,246,439 B2 | 8/2012 | Kelly |
| 8,277,298 B2 | 10/2012 | Mace |
| 8,313,372 B2 | 11/2012 | Naicker |
| 8,317,620 B2 | 11/2012 | Kelly |
| 8,342,957 B2 | 1/2013 | Carpenter |
| 8,382,572 B2 | 2/2013 | Hoffman |
| 8,419,520 B2 | 4/2013 | Johnson |
| 8,419,546 B2 | 4/2013 | Decasa |
| 8,430,736 B2 | 4/2013 | Cannon |
| 8,439,733 B2 | 5/2013 | Kay |
| 8,449,386 B2 | 5/2013 | Englman |
| 8,465,363 B1 | 6/2013 | Mayeroff |
| 8,469,788 B2 | 6/2013 | Carpenter |
| 8,485,892 B2 | 7/2013 | Nguyen |
| 8,506,394 B2 | 8/2013 | Kelly |
| 8,512,119 B2 | 8/2013 | Kelly |
| 8,523,682 B2 | 9/2013 | Bickley |
| 8,540,577 B2 | 9/2013 | Shvili |
| 8,562,418 B2 | 10/2013 | Gomez |
| 8,585,481 B2 | 11/2013 | Owen |
| 8,585,494 B2 | 11/2013 | Parrinello |
| 8,591,338 B2 | 11/2013 | Nguyen |
| D694,773 S | 12/2013 | Sakaguchi |
| D695,778 S | 12/2013 | Edwards |
| 8,602,877 B2 | 12/2013 | Carpenter |
| 8,613,650 B2 | 12/2013 | Kovacs |
| 8,622,793 B2 | 1/2014 | Ford |
| 8,622,817 B2 | 1/2014 | Englman |
| 8,641,507 B2 | 2/2014 | Kelly |
| 8,641,515 B2 | 2/2014 | Nicely |
| 8,684,830 B1 | 4/2014 | Chun |
| 8,690,661 B2 | 4/2014 | Cannon |
| 8,702,499 B2 | 4/2014 | Johnson |
| 8,702,520 B2 | 4/2014 | Seelig |
| 8,715,051 B2 | 5/2014 | Davis |
| 8,715,052 B2 | 5/2014 | Bennett |
| 8,715,069 B2 | 5/2014 | Arnone |
| 8,721,421 B2 | 5/2014 | Tempest |
| 8,734,232 B2 | 5/2014 | Bunch |
| D706,808 S | 6/2014 | Edwards |
| D710,372 S | 8/2014 | Dellinger |
| 8,801,518 B2 | 8/2014 | Lipscomb |
| 8,808,077 B1 | 8/2014 | Chun |
| 8,840,462 B2 | 9/2014 | Patel |
| 8,851,980 B2 | 10/2014 | Versaci |
| 8,851,981 B2 | 10/2014 | Ramsey |
| 8,852,001 B2 | 10/2014 | Kelly |
| 8,870,659 B2 | 10/2014 | House |
| 8,894,480 B2 | 11/2014 | Johnson |
| 8,905,841 B2 | 12/2014 | Carpenter |
| 9,005,010 B2 | 4/2015 | Watkins |
| 9,011,241 B2 | 4/2015 | Kelly |
| D730,373 S | 5/2015 | Clement |
| 9,022,867 B2 | 5/2015 | Kelly |
| 9,033,786 B2 | 5/2015 | Kelly |
| D732,054 S | 6/2015 | Yoneda |
| 9,070,255 B2 | 6/2015 | Christensen |
| 9,111,416 B2 | 8/2015 | Cannon |
| 9,123,208 B2 | 9/2015 | Davis |
| 9,123,210 B2 | 9/2015 | Bennett |
| D741,897 S | 10/2015 | Wilkinson |
| 9,155,968 B2 | 10/2015 | Hedrick |
| 9,159,198 B2 | 10/2015 | Moshal |
| 9,165,429 B2 | 10/2015 | Cannon |
| 9,165,430 B2 | 10/2015 | Bickley |
| 9,171,426 B2 | 10/2015 | Dimichele |
| 9,177,445 B2 | 11/2015 | Vemuri |
| 9,214,056 B2 | 12/2015 | Kovacs |
| D750,113 S | 2/2016 | Kettner |
| 9,286,756 B2 | 3/2016 | Bramble |
| D753,158 S | 4/2016 | Mezzanotte |
| 9,311,773 B2 | 4/2016 | Chun |
| D759,065 S | 6/2016 | Mezzanotte |
| 9,361,754 B2 | 6/2016 | Decasa, Jr. |
| 9,364,753 B2 | 6/2016 | Bennett |
| 9,384,631 B2 | 7/2016 | Arnone |
| 9,384,635 B2 | 7/2016 | Nguyen |
| 9,401,073 B2 | 7/2016 | Lee |
| D763,904 S | 8/2016 | Knapp |
| 9,430,908 B2 | 8/2016 | Owen |

(56) References Cited

U.S. PATENT DOCUMENTS

| | | |
|---|---|---|
| 9,443,393 B2 | 9/2016 | Johnson |
| 9,443,394 B2 | 9/2016 | Carpenter |
| D771,670 S | 11/2016 | Chan |
| D772,252 S | 11/2016 | Myers |
| D772,260 S | 11/2016 | Thomas |
| D772,894 S | 11/2016 | Zhao |
| 9,495,838 B2 | 11/2016 | Davis |
| 9,520,020 B2 | 12/2016 | Bickley |
| 9,530,280 B2 | 12/2016 | Melnick |
| 9,558,632 B2 | 1/2017 | Melnick |
| D780,201 S | 2/2017 | Zielinski |
| 9,569,933 B2 | 2/2017 | Baker |
| 9,607,479 B2 | 3/2017 | Robbins |
| D783,655 S | 4/2017 | Hu |
| 9,613,492 B2 | 4/2017 | Englman |
| 9,616,331 B1 | 4/2017 | Jordan |
| 9,626,836 B2 | 4/2017 | Arnone |
| 9,633,509 B2 | 4/2017 | Cannon |
| D788,167 S | 5/2017 | Fox Uribe |
| 9,656,174 B1 | 5/2017 | McLellan |
| 9,697,671 B2 | 7/2017 | Moody |
| 9,697,674 B2 | 7/2017 | Morrissette |
| 9,715,790 B2 | 7/2017 | Arnone |
| 9,734,660 B2 | 8/2017 | Kiely |
| 9,747,754 B2 | 8/2017 | Carpenter |
| D801,990 S | 11/2017 | Reissner |
| D804,505 S | 12/2017 | Hoffman |
| 9,858,750 B2 | 1/2018 | Kovacs |
| 9,984,529 B2 | 5/2018 | Kim |
| 9,990,806 B2 | 6/2018 | Davis |
| D823,336 S | 7/2018 | Tinney |
| 10,013,852 B1 | 7/2018 | Jordan |
| 10,032,338 B2 | 7/2018 | Lark |
| 10,055,940 B2 | 8/2018 | Arnone |
| 10,068,432 B2 | 9/2018 | Wortmann |
| 10,109,155 B2 | 10/2018 | Chase |
| D834,604 S | 11/2018 | Feldman |
| D836,653 S | 12/2018 | Zhou |
| 10,163,305 B2 | 12/2018 | Wortmann |
| 10,195,532 B1 | 2/2019 | Mclellan |
| 10,210,706 B2 | 2/2019 | Penacho |
| D842,316 S | 3/2019 | Toth |
| 10,235,841 B2 | 3/2019 | Nguyen |
| 10,255,765 B2 | 4/2019 | Washington |
| D847,833 S | 5/2019 | Toth |
| D849,771 S | 5/2019 | Foley |
| D852,830 S | 7/2019 | Penacho |
| D854,554 S | 7/2019 | Toth |
| 10,354,491 B2 | 7/2019 | Melnick |
| 10,360,766 B2 | 7/2019 | Arnone |
| 10,373,442 B2 | 8/2019 | Schlottmann |
| 10,395,474 B2 | 8/2019 | Englman |
| D858,535 S | 9/2019 | Evans |
| 10,424,162 B2 | 9/2019 | Heenan |
| D861,703 S | 10/2019 | Suslik |
| D861,710 S | 10/2019 | Frackelton |
| 10,445,985 B2 | 10/2019 | Davis |
| 10,460,568 B2 | 10/2019 | Givant |
| D867,391 S | 11/2019 | Yoshioka |
| D868,825 S | 12/2019 | Paulik |
| D870,123 S | 12/2019 | Butcher |
| D870,126 S | 12/2019 | Crispino |
| 10,504,332 B2 | 12/2019 | Riggs |
| 10,510,215 B2 | 12/2019 | Arnone |
| 10,515,514 B1 | 12/2019 | Weaver |
| 10,540,852 B2 | 1/2020 | Lark |
| D875,110 S | 2/2020 | Spors |
| D876,450 S | 2/2020 | Suslik |
| D876,477 S | 2/2020 | Gansert |
| D879,122 S | 3/2020 | Ebler |
| 10,621,829 B2 | 4/2020 | Loader |
| D889,493 S | 7/2020 | Schwegler |
| D890,790 S | 7/2020 | Marks |
| D895,645 S | 9/2020 | Sanborn |
| D896,256 S | 9/2020 | Kawaichi |
| 10,789,814 B2 | 9/2020 | Palmisano |
| D898,769 S | 10/2020 | Park |
| D905,106 S | 12/2020 | Kang |
| D905,736 S | 12/2020 | Felkins |
| 10,864,443 B2 | 12/2020 | Eatedali |
| 10,872,492 B2 | 12/2020 | Oberberger |
| D910,071 S | 2/2021 | Chen |
| D913,325 S | 3/2021 | Chen |
| D914,056 S | 3/2021 | Chen |
| D916,754 S | 4/2021 | Johnson |
| D916,903 S | 4/2021 | Arena |
| D917,503 S | 4/2021 | Sakurai |
| 11,055,951 B2 | 7/2021 | La Guardia |
| 11,183,020 B2 | 11/2021 | Berman |
| 2001/0034260 A1 | 10/2001 | Anthony |
| 2001/0054003 A1 | 12/2001 | Chien |
| 2002/0028707 A1 | 3/2002 | Pascal |
| 2002/0119824 A1 | 8/2002 | Allen |
| 2002/0183105 A1 | 12/2002 | Cannon |
| 2003/0050831 A1 | 3/2003 | Klayh |
| 2003/0060264 A1 | 3/2003 | Chilton |
| 2004/0229700 A1 | 11/2004 | Cannon |
| 2005/0020352 A1 | 1/2005 | Chilton |
| 2005/0071024 A1 | 3/2005 | Henshaw |
| 2005/0160003 A1 | 7/2005 | Berardi |
| 2006/0058082 A1 | 3/2006 | Crawford |
| 2006/0082056 A1 | 4/2006 | Kane |
| 2006/0148565 A1 | 7/2006 | Gauselmann |
| 2006/0157934 A1 | 7/2006 | Yoseloff |
| 2006/0178202 A1 | 8/2006 | Hughes |
| 2006/0287045 A1 | 12/2006 | Walker |
| 2007/0129147 A1 | 6/2007 | Gagner |
| 2007/0191102 A1 | 8/2007 | Coliz |
| 2007/0218968 A1 | 9/2007 | Snow |
| 2007/0218982 A1 | 9/2007 | Baerlocher |
| 2007/0243936 A1 | 10/2007 | Binenstock |
| 2007/0260510 A1 | 11/2007 | Chrzan |
| 2008/0045288 A1 | 2/2008 | Moshal |
| 2008/0070692 A1 | 3/2008 | Schlottmann |
| 2008/0070693 A1 | 3/2008 | Schlottmann |
| 2008/0070694 A1 | 3/2008 | Schlottmann |
| 2008/0070695 A1 | 3/2008 | Baerlocher |
| 2008/0076520 A1 | 3/2008 | Chan |
| 2008/0146305 A1 | 6/2008 | Moody |
| 2008/0207313 A1 | 8/2008 | Acres |
| 2008/0254883 A1 | 10/2008 | Patel |
| 2009/0005150 A1 | 1/2009 | Haveson |
| 2009/0011810 A1 | 1/2009 | Moshal |
| 2009/0011827 A1 | 1/2009 | Englman |
| 2009/0029773 A1 | 1/2009 | Cherry |
| 2009/0061997 A1 | 3/2009 | Popovich |
| 2009/0061999 A1 | 3/2009 | Popovich |
| 2009/0069093 A1 | 3/2009 | Kelly |
| 2009/0104965 A1 | 4/2009 | House |
| 2009/0118000 A1 | 5/2009 | Yoshizawa |
| 2009/0124320 A1 | 5/2009 | Dewaal |
| 2009/0124364 A1 | 5/2009 | Cuddy |
| 2009/0170584 A1 | 7/2009 | Tan |
| 2009/0197659 A1 | 8/2009 | Christensen |
| 2009/0270168 A1 | 10/2009 | Englman |
| 2009/0275374 A1 | 11/2009 | Nelson |
| 2010/0022307 A1 | 1/2010 | Steuer |
| 2010/0035674 A1 | 2/2010 | Slomiany |
| 2010/0062840 A1 | 3/2010 | Herrmann |
| 2010/0070056 A1 | 3/2010 | Coronel |
| 2010/0105470 A1 | 4/2010 | Englman |
| 2010/0120503 A1 | 5/2010 | Hoffman |
| 2010/0197377 A1 | 8/2010 | Aoki |
| 2010/0210356 A1 | 8/2010 | Losica |
| 2010/0210362 A1 | 8/2010 | Toompere |
| 2010/0227686 A1 | 9/2010 | Brunet De Courssou |
| 2010/0311497 A1 | 12/2010 | Suslik |
| 2011/0014964 A1 | 1/2011 | Crowder, Jr. |
| 2011/0028160 A1 | 2/2011 | Roeding |
| 2011/0070940 A1 | 3/2011 | Jaffe |
| 2011/0111856 A1 | 5/2011 | White |
| 2011/0130186 A1 | 6/2011 | Chim |
| 2011/0281248 A1* | 11/2011 | Feenstra ............ G09B 19/003 434/247 |

(56) References Cited

U.S. PATENT DOCUMENTS

| | | |
|---|---|---|
| 2011/0281624 A1 | 11/2011 | Moody |
| 2012/0059701 A1 | 3/2012 | Van Der Veen |
| 2012/0122561 A1 | 5/2012 | Hedrick |
| 2012/0129610 A1 | 5/2012 | Mazursky |
| 2012/0225724 A1 | 9/2012 | Barber |
| 2013/0029739 A1 | 1/2013 | Ramsey |
| 2013/0065676 A1 | 3/2013 | Owen |
| 2013/0072294 A1 | 3/2013 | Mosley |
| 2013/0116809 A1 | 5/2013 | Carpenter |
| 2013/0122978 A1 | 5/2013 | Slomiany |
| 2013/0244751 A1 | 9/2013 | Bennett |
| 2013/0252704 A1 | 9/2013 | Gilbertson |
| 2013/0281179 A1 | 10/2013 | Tempest |
| 2013/0296036 A1 | 11/2013 | Scott |
| 2013/0310127 A1 | 11/2013 | Bradley |
| 2013/0331181 A1 | 12/2013 | Newton |
| 2013/0331184 A1 | 12/2013 | Kelly |
| 2013/0331968 A1 | 12/2013 | Newton |
| 2014/0038703 A1 | 2/2014 | Lampert |
| 2014/0038724 A1 | 2/2014 | Layne, IV |
| 2014/0051520 A1 | 2/2014 | Davis |
| 2014/0087815 A1 | 3/2014 | Caputo |
| 2014/0106866 A1* | 4/2014 | Hardy ............... G07F 17/3244 463/25 |
| 2014/0162787 A1 | 6/2014 | Carpenter |
| 2014/0194176 A1 | 7/2014 | Robbins |
| 2014/0274308 A1 | 9/2014 | Guinn |
| 2014/0323199 A1 | 10/2014 | Dimichele |
| 2015/0018070 A1 | 1/2015 | Meyer |
| 2015/0088624 A1 | 3/2015 | Frederick |
| 2015/0099576 A1 | 4/2015 | Anderson |
| 2015/0199878 A1 | 7/2015 | Wright |
| 2015/0228151 A1 | 8/2015 | Damodaran |
| 2015/0248810 A1 | 9/2015 | Wortmann |
| 2015/0287069 A1 | 10/2015 | Gissara |
| 2015/0348361 A1 | 12/2015 | Adiraju |
| 2015/0355727 A1 | 12/2015 | Hu |
| 2015/0356815 A1 | 12/2015 | Kim |
| 2015/0379822 A1 | 12/2015 | Ellis |
| 2016/0063807 A1 | 3/2016 | Bennett |
| 2016/0104344 A1 | 4/2016 | Meyer |
| 2016/0140807 A1 | 5/2016 | Chase |
| 2016/0148126 A1 | 5/2016 | Paleja |
| 2016/0217646 A1 | 7/2016 | Hornik |
| 2016/0275757 A1 | 9/2016 | Decasa, Jr. |
| 2016/0284157 A1 | 9/2016 | Marrinson |
| 2016/0328918 A1 | 11/2016 | De Waal |
| 2016/0358180 A1* | 12/2016 | Van Os ............... G06Q 20/4018 |
| 2017/0161999 A1 | 6/2017 | Givant |
| 2017/0200349 A1 | 7/2017 | Englman |
| 2017/0301039 A1 | 10/2017 | Dyer |
| 2017/0323528 A1 | 11/2017 | Arnone |
| 2017/0337775 A1 | 11/2017 | Singer |
| 2017/0345006 A1 | 11/2017 | Kohli |
| 2018/0052582 A1 | 2/2018 | Hilbert |
| 2018/0068529 A1 | 3/2018 | Delekta |
| 2018/0075693 A1* | 3/2018 | Cage ............... G07F 17/3255 |
| 2018/0075708 A1 | 3/2018 | San |
| 2018/0089953 A1 | 3/2018 | Palmisano |
| 2018/0089954 A1 | 3/2018 | Carpenter |
| 2018/0095616 A1 | 4/2018 | Valdivia |
| 2018/0130312 A1 | 5/2018 | Cire |
| 2018/0146206 A1 | 5/2018 | Weekes |
| 2018/0268652 A1 | 9/2018 | Crittenden |
| 2019/0066446 A1 | 2/2019 | Mariscal |
| 2019/0073859 A1 | 3/2019 | Penacho |
| 2019/0080562 A1 | 3/2019 | Jungmann |
| 2019/0096182 A1 | 3/2019 | Oberberger |
| 2019/0102993 A1 | 4/2019 | Washington |
| 2019/0139366 A1 | 5/2019 | Davis |
| 2019/0147706 A1 | 5/2019 | Bolling, Jr. |
| 2019/0244482 A1 | 8/2019 | Washington |
| 2019/0262717 A1 | 8/2019 | Thielbar |
| 2019/0287344 A1 | 9/2019 | Oberberger |
| 2019/0333314 A1 | 10/2019 | Henshaw |
| 2019/0340883 A1 | 11/2019 | Arnone |
| 2019/0347907 A1 | 11/2019 | Bolling, Jr. |
| 2019/0378379 A1 | 12/2019 | Satterlie |
| 2019/0385406 A1 | 12/2019 | Marks |
| 2020/0043233 A1 | 2/2020 | Nelson |
| 2020/0043293 A1 | 2/2020 | Nelson |
| 2020/0043294 A1 | 2/2020 | Davis |
| 2020/0065841 A1 | 2/2020 | Hernandez |
| 2020/0111293 A1 | 4/2020 | Oberberger |
| 2020/0184775 A1 | 6/2020 | Oberberger |
| 2020/0279451 A1 | 9/2020 | La Guardia |
| 2020/0364987 A1 | 11/2020 | Weaver |
| 2021/0007632 A1 | 1/2021 | Blahnik |
| 2021/0256811 A1 | 8/2021 | Ma |

FOREIGN PATENT DOCUMENTS

| | | |
|---|---|---|
| AU | 1997029346 A1 | 11/1997 |
| AU | 1997030070 A1 | 11/1997 |
| AU | 1997035809 A1 | 1/1998 |
| AU | 700667 B2 | 1/1999 |
| AU | 2001036378 A1 | 5/2001 |
| AU | 2001294751 A1 | 6/2002 |
| AU | 2002311978 A1 | 12/2002 |
| AU | 755912 B2 | 1/2003 |
| AU | 2002250161 A1 | 7/2003 |
| AU | 2003281244 A1 | 1/2004 |
| AU | 2004904539 | 8/2004 |
| AU | 2005203403 A1 | 2/2006 |
| AU | 2005285317 A1 | 3/2006 |
| AU | 2002306874 B2 | 6/2006 |
| AU | 2006200237 A1 | 8/2006 |
| AU | 2007200711 A1 | 10/2007 |
| AU | 2008100162 B4 | 4/2008 |
| AU | 2008100163 B4 | 4/2008 |
| AU | 2006208418 B2 | 11/2008 |
| AU | 2007211906 B2 | 2/2009 |
| AU | 2005235004 B2 | 4/2009 |
| AU | 2008323670 B2 | 5/2009 |
| AU | 2007216930 B2 | 3/2010 |
| AU | 2007237214 B2 | 3/2010 |
| AU | 2008200060 B2 | 3/2010 |
| AU | 2004267734 B2 | 7/2010 |
| AU | 2010200449 A1 | 9/2010 |
| AU | 2005270750 B2 | 12/2010 |
| AU | 2010202077 A1 | 12/2010 |
| AU | 2004267733 B2 | 1/2011 |
| AU | 2004267746 B2 | 1/2011 |
| AU | 2005203404 B2 | 3/2011 |
| AU | 2011200529 A1 | 3/2011 |
| AU | 2010246507 A1 | 6/2011 |
| AU | 2007200050 B2 | 9/2011 |
| AU | 2006302141 B2 | 1/2012 |
| AU | 2005248969 B2 | 2/2012 |
| AU | 2011205125 A1 | 3/2012 |
| AU | 2011200434 B2 | 11/2012 |
| AU | 2010202282 B2 | 1/2013 |
| AU | 2012268860 A1 | 1/2013 |
| AU | 2008312413 B2 | 9/2013 |
| AU | 2013254911 A1 | 11/2013 |
| AU | 2014900096 | 1/2014 |
| AU | 2013202667 B2 | 1/2015 |
| AU | 2015201979 A1 | 5/2015 |
| AU | 2012326136 B2 | 6/2015 |
| AU | 2015200050 A1 | 7/2015 |
| AU | 2013213728 B2 | 1/2016 |
| AU | 2011307385 B2 | 3/2016 |
| AU | 2016203321 A1 | 6/2016 |
| AU | 2016204577 A1 | 7/2016 |
| AU | 2014395471 A1 | 1/2017 |
| AU | 2014317574 B2 | 6/2017 |
| AU | 2014317575 B2 | 6/2017 |
| AU | 2016349725 A1 | 6/2018 |
| AU | 2018203786 A1 | 6/2018 |
| AU | 2018203839 A1 | 6/2018 |
| CA | 2340562 A1 | 8/2002 |
| CA | 2536018 A1 | 3/2005 |
| CA | 2920520 A1 | 3/2005 |
| CA | 2538706 A1 | 4/2005 |

(56) References Cited

FOREIGN PATENT DOCUMENTS

| | | |
|---|---|---|
| CA | 2259197 C | 9/2005 |
| CA | 2253884 C | 11/2005 |
| CA | 2563942 A1 | 11/2005 |
| CA | 2580187 A1 | 3/2006 |
| CA | 2522944 A1 | 7/2006 |
| CA | 2527367 A1 | 5/2007 |
| CA | 2527416 A1 | 5/2007 |
| CA | 2403035 C | 7/2007 |
| CA | 2572719 A1 | 7/2007 |
| CA | 2604412 A1 | 4/2008 |
| CA | 2617034 A1 | 7/2008 |
| CA | 2691337 A1 | 8/2010 |
| CA | 2812377 A1 | 4/2012 |
| CA | 2838347 A1 | 12/2012 |
| CA | 2852464 A1 | 4/2013 |
| CA | 2876890 A1 | 7/2015 |
| CA | 2947448 A1 | 11/2015 |
| CA | 2956084 A1 | 1/2016 |
| CA | 2535880 C | 4/2016 |
| CA | 2599635 C | 8/2016 |
| CA | 2535838 C | 9/2016 |
| CA | 2941629 A1 | 3/2017 |
| CA | 3004490 A1 | 5/2017 |
| CA | 3017742 A1 | 9/2017 |
| CA | 3017745 A1 | 9/2017 |
| CA | 2655095 C | 4/2018 |
| CN | 1853203 A | 10/2006 |
| CN | 1853204 A | 10/2006 |
| CN | 1853205 A | 10/2006 |
| CN | 101018592 A | 8/2007 |
| CN | 101043923 A | 9/2007 |
| CN | 101044523 A | 9/2007 |
| CN | 101044525 A | 9/2007 |
| CN | 101321564 B | 7/2011 |
| DE | 19740287 A1 | 3/1998 |
| EP | 1021228 A4 | 1/2001 |
| EP | 1296294 A3 | 2/2004 |
| EP | 1644902 A2 | 4/2006 |
| EP | 1656647 A1 | 5/2006 |
| EP | 1656648 A1 | 5/2006 |
| EP | 1677263 A3 | 4/2007 |
| EP | 1794721 A1 | 6/2007 |
| EP | 1903522 A1 | 3/2008 |
| EP | 1912185 A1 | 4/2008 |
| EP | 1933960 A2 | 6/2008 |
| EP | 2003630 A1 | 12/2008 |
| EP | 1740281 A4 | 2/2009 |
| EP | 1814091 A3 | 2/2009 |
| EP | 2218487 A3 | 8/2010 |
| EP | 2435995 A1 | 4/2012 |
| EP | 2723462 A4 | 11/2014 |
| EP | 2621595 A4 | 6/2015 |
| EP | 3171951 A4 | 12/2017 |
| EP | 3149713 A4 | 2/2018 |
| EP | 3429710 A2 | 1/2019 |
| EP | 3429711 A1 | 1/2019 |
| GB | 2387950 A | 10/2003 |
| GB | 0409224 | 4/2004 |
| GB | 2401063 B | 10/2006 |
| GB | 2427149 B | 3/2007 |
| HK | 1237704 A | 4/2018 |
| IL | 216538 A | 2/2012 |
| IN | 201847034966 A | 9/2018 |
| JP | 2007502658 A | 2/2007 |
| JP | 2007502659 A | 2/2007 |
| JP | 2007502661 A | 2/2007 |
| JP | 5941152 B2 | 6/2016 |
| JP | 2017518850 A | 7/2017 |
| MO | I000434 A | 2/2008 |
| MO | I000877 A | 3/2009 |
| MO | I001296 C | 5/2016 |
| MO | I001298 C | 5/2016 |
| NZ | 703662 A | 7/2015 |
| PH | 12018501052 A1 | 1/2019 |
| RU | 96117375 C1 | 9/1999 |
| SG | 131166 A1 | 5/2007 |
| SG | 11201401444 S | 5/2014 |
| SG | 10201500175 | 8/2015 |
| SG | 11201803977 W | 6/2018 |
| TW | 573262 B | 1/2004 |
| WO | 1997027921 A1 | 8/1997 |
| WO | 1997039811 A1 | 10/1997 |
| WO | 1997041933 A1 | 11/1997 |
| WO | 1998000210 A1 | 1/1998 |
| WO | 2001032276 A3 | 2/2002 |
| WO | 2003059472 A1 | 7/2003 |
| WO | 2002094399 A8 | 8/2003 |
| WO | 2002027676 A8 | 9/2003 |
| WO | 2003083796 A1 | 10/2003 |
| WO | 2004004853 A2 | 1/2004 |
| WO | 2005020165 A1 | 3/2005 |
| WO | 2005020166 A1 | 3/2005 |
| WO | 2005020164 A3 | 4/2005 |
| WO | 2005030353 A3 | 4/2005 |
| WO | 2005102480 A1 | 11/2005 |
| WO | 2006015442 A1 | 2/2006 |
| WO | 2006031439 A1 | 3/2006 |
| WO | 2005110563 A3 | 1/2007 |
| WO | 2007044785 A3 | 4/2007 |
| WO | 2007050119 A3 | 7/2007 |
| WO | 2007087297 A3 | 7/2008 |
| WO | 2007146791 A3 | 12/2008 |
| WO | 2009006274 A1 | 1/2009 |
| WO | 2009052300 A1 | 4/2009 |
| WO | 2009062187 A1 | 5/2009 |
| WO | 2009086466 A3 | 7/2009 |
| WO | 2009108805 A3 | 9/2009 |
| WO | 2010011673 A1 | 1/2010 |
| WO | 2009135086 A3 | 2/2010 |
| WO | 2010054061 A1 | 5/2010 |
| WO | 2010098808 A1 | 9/2010 |
| WO | 2010137010 A1 | 12/2010 |
| WO | 2011019949 A9 | 11/2011 |
| WO | 2012044559 A1 | 4/2012 |
| WO | 2013059372 A3 | 4/2013 |
| WO | 2013052453 A3 | 5/2014 |
| WO | 2014074271 A1 | 5/2014 |
| WO | 2014210080 A1 | 12/2014 |
| WO | 2015172060 A1 | 11/2015 |
| WO | 2015183335 A8 | 12/2015 |
| WO | 2016014266 A1 | 1/2016 |
| WO | 2017079706 A1 | 5/2017 |
| WO | 2017160910 A1 | 9/2017 |
| WO | 2017160917 A3 | 12/2017 |
| WO | 2019125422 A1 | 6/2019 |
| WO | 2019168646 A1 | 9/2019 |
| ZA | 201500185 B | 12/2015 |

OTHER PUBLICATIONS

Consumer response to characteristics of price—matching guarantees: The moderating role of consumer and retailer characteristics. Author: Kukar-Kinney, Monika. Publication ingfo: Indiana University. ProQuest Dissertations & Theses, 2003. (Year: 2003).*

"Cashman Casino," Sep. 2018 screenshot from YouTube video. Publication date Apr. 4, 2017, 1 page.

"House of Fun," Sep. 2018 screenshot from web page: "https://www.houseoffun.com/play-now/," 1 page.

Office Action dated May 14, 2020 for U.S. Appl. No. 16/290,836 (pp. 1-5).

Office Action dated Jul. 20, 2020 for U.S. Appl. No. 16/290,833 (pp. 1-9).

Notice of Allowance dated Jun. 17, 2020 for U.S. Appl. No. 29/682,178 (pp. 1-10).

"Gold Stacks 88 Lunar Festival Slot—Nice Session, All Features!" Feb. 14, 2019, YouTube, site visited May 27, 2020: https://www.youtube.conn/watch?v=kusOLt2fvM4 (Year: 2019) 1 page.

"Figures and Polygons" Sep. 15, 2008, Themathleague, site visited May 27, 2020: https://www.mathleague.com/index.php/ connponent/content/article/31-nnathleaguewebsite/general/75-figuresandpolygons#octagon (Year: 2018) 2 pages.

(56) References Cited

OTHER PUBLICATIONS

"Catherine Wheels, Fireworks, android/ios game" Oct. 24, 2015, YouTube, site visited May 27, 2020: https://www.youtube.com/watch?v=DzCYicyl FJA (Year: 2015) 1 page.
"Golden Firework Video Slot Casino Game with a "Mega Win" Free Spin Bonus" Apr. 16, 2018, YouTube, site visited May 27, 2020: https://www.youtube.conn/watch?v=YgCbY7c-nYM (Year: 2018) 1 page.
"Lucky Firecracker slot game [Wild Jackpots]" Jan. 30, 2015, YouTube, site visited May 27, 2020: https://www.youtube.com/watch?v=Gzfe182Qtbc (Year: 2015) 1 page.
Office Action dated Jun. 23, 2020 for U.S. Appl. No. 29/682,179 (pp. 1-11).
"iSoftBet—Scrolls of Ra HD" May 8, 2015, YouTube, site visited Jun. 16, 2020: https://www.youtube.conn/watch?V=9ZciLdlqQNo (Year: 2015) 1 page.
"New Game  Fortune Scroll  Slot Lover" Feb. 11, 2019, YouTube, site visited Jun. 16, 2020: https://www.youtube.conn/watch?v=cdCsvzzRHvs&list=LLMFvEIKJd5VZ1hOwZ7BZDdQ&index=2873 (Year: 2019) 1 page.
"Hot Shot Twin Fire Live Play with many features BALLY Slot Machine" Jan. 8, 2017, YouTube, site visited Jun. 16, 2020: https://www.youtube.com/watch?v=b_03gJvQecw (Year: 2017) 1 page.
"Traditional Torah Icon" Feb. 6, 2018, Alamy, site visited Jun. 16, 2020: https://www.alamy.com/ stock-photo-traditional-torah-icon-174149305.htnnl (Year: 2018) 1 page.
"Paper Scroll Clip Art" Dec. 11, 2017, FavPNG, site visited Jun. 16, 2020: https://favpng.com/png_view/paper-scroll-clip-art-png/DDpwDsEh (Year: 2017) 3 pages.
"Torah Scroll Icon" Jun. 25, 2018, Depositphotos, site visited Jun. 16, 2020: https://depositphotos.com/201375256/stock-illustration-torah-scroll-icon-outline-style.html (Year: 2018) 1 page.
Legato, Frank, "Tourney Time", Global Gaming Business Magazine, Mar. 22, 2019, retrieved from internet on Oct. 7, 2019, https://ggbmagazine.com/article/tourney-time/, 20 pages.
Office Action dated Aug. 18, 2020 for U.S. Appl. No. 29/703,046 (pp. 1-12).
Countdown Timer Background 10 Seconds, by Kanadaka, YouTube [online], published on Dec. 16, 2013, [retrieved on Aug. 13, 2020], retrieved from the Internet <URL: https://www.youtube.com/watch?v=AwOYH3RDUe4> (Year: 2013) 1 page.
3 2 1 GO! Countdown Green Screen, by Da24Gemini, YouTube [online], published on Sep. 15, 2012, [retrieved on Aug. 13, 2020], retrieved from the Internet <URL: https://www.youtube.com/watch?v=WJhxCcx1 M4g> (Year: 2012) 1 page.
Candy Words—Match Word Puzzle Game, by Homer S, YouTube [online], published on Mar. 5, 2019, [retrieved on Aug. 13, 2020], retrieved from the Internet <URL: https://www.youtube.com/watch?v=4TsGNDLrpWk> (Year: 2019) 1 page.
Notice of Allowance dated Aug. 26, 2020 for U.S. Appl. No. 16/290,836 (pp. 1-8).
Notice of Allowance dated Oct. 7, 2020 for U.S. Appl. No. 29/682,179 (pp. 1-7).
Office Action dated Nov. 12, 2020 for U.S. Appl. No. 16/290,833 (pp. 1-8).
Notice of Allowance dated Jan. 7, 2021 for U.S. Appl. No. 29/703,046 (pp. 1-9).
Office Action dated Jan. 27, 2021 for U.S. Appl. No. 16/290,838 (pp. 1-9).

International Search Report and Written Opinion for App. No. PCT/US19/53398, dated Jan. 6, 2020, 9 pages.
International Search Report and Written Opinion for App. No. PCT/US19/53407, dated Jan. 9, 2020, 8 pages.
Notice of Allowance dated Mar. 15, 2021 for U.S. Appl. No. 16/290,833 (pp. 1-8).
International Preliminary Report on Patentability for App. No. PCT/US2019/053407, dated Apr. 15, 2021, 8 pages.
Office Action dated May 11, 2021 for U.S. Appl. No. 16/946,113 (pp. 1-14).
Notice of Allowance dated May 19, 2021 for U.S. Appl. No. 29/703,046 (pp. 1-8).
Supplemental Notice of Allowability dated Jun. 7, 2021 for U.S. Appl. No. 16/290,833 (pp. 1-2).
Office Action (Final Rejection) dated Aug. 5, 2021 for U.S. Appl. No. 16/290,838 (pp. 1-7).
Corrected Notice of Allowability dated Aug. 18, 2021 for U.S. Appl. No. 29/703,046 (pp. 1-4).
Office Action (Notice of Allowance and Fees Due (PTOL-85)) dated Oct. 21, 2021 for U.S. Appl. No. 16/946,113 (pp. 1-5).
Office Action (Notice of Allowance and Fees Due (PTOL-85)) dated Nov. 9, 2021 for U.S. Appl. No. 16/290,838 (pp. 1-7).
IP.com NPL Search Strategy (Year: 2021).
Office Action (Non-Final Rejection) dated Dec. 27, 2021 for U.S. Appl. No. 17/058,548 (pp. 1-32).
Office Action (Non-Final Rejection) dated Mar. 25, 2022 for U.S. Appl. No. 17/304,107 (pp. 1-7).
Office Action (Non-Final Rejection) dated Apr. 1, 2022 for U.S. Appl. No. 17/058,531 (pp. 1-15).
Office Action (Final Rejection) dated Apr. 12, 2022 for U.S. Appl. No. 17/058,548 (pp. 1-18).
Office Action (Non-Final Rejection) dated May 6, 2022 for U.S. Appl. No. 16/948,961 (pp. 1-16).
Office Action (Non-Final Rejection) dated May 24, 2022 for U.S. Appl. No. 16/946,114 (pp. 1-8).
Office Action (Non-Final Rejection) dated Jun. 9, 2022 for U.S. Appl. No. 16/948,846 (pp. 1-7).
Office Action (Non-Final Rejection) dated Jun. 22, 2022 for U.S. Appl. No. 16/946,116 (pp. 1-16).
Office Action (Notice of Allowance and Fees Due (PTOL-85)) dated Jul. 27, 2022 for U.S. Appl. No. 16/948,846 (pp. 1-7).
Office Action (Final Rejection) dated Jul. 27, 2022 for U.S. Appl. No. 17/304,107 (pp. 1-8).
Office Action (Non-Final Rejection) dated Jul. 21, 2022 for U.S. Appl. No. 16/946,117 (pp. 1-6).
Office Action (Notice of Allowance and Fees Due (PTOL-85)) dated Aug. 8, 2022 for U.S. Appl. No. 17/058,548 (pp. 1-13).
Australian Examination Report No. 1 issued in App. No. AU2021202856, dated Aug. 5, 2022, 6 pages.
Office Action (Notice of Allowance and Fees Due (PTOL-85)) dated Nov. 10, 2022 for U.S. Appl. No. 17/058,548 (pp. 1-2).
Office Action (Non-Final Rejection) dated Jul. 28, 2023 for U.S. Appl. No. 18/058,618 (pp. 1-27).
Notice of Allowance dated Nov. 21, 2023 for U.S. Appl. No. 18/058,618 (pp. 1-13).
Office Action (Notice of Allowance and Fees Due (PTOL-85)) dated Nov. 21, 2023 for U.S. Appl. No. 18/058,618 (pp. 1-12).
Office Action (Notice of Allowance and Fees Due (PTOL-85)) dated Dec. 6, 2023 for U.S. Appl. No. 18/058,618 (pp. 1-3).
Australian Examination Report No. 1 issued in App. No. AU2023210674, dated Sep. 2, 2024, 5 pages.

* cited by examiner

SYSTEMS AND METHODS FOR PROVIDING DYNAMIC REWARDS

CROSS REFERENCE TO RELATED APPLICATIONS

This application is a continuation of and claims priority to U.S. patent application Ser. No. 18/058,618, filed Nov. 23, 2022, which is a continuation of U.S. patent application Ser. No. 17/058,548, now U.S. Pat. No. 11,521,462, filed Nov. 24, 2020, which claims priority to International Application No. PCT/US2019/053407, filed Sep. 27, 2019, which claims priority to U.S. Provisional Patent Application No. 62/741,726, filed Oct. 5, 2018, each of which is hereby incorporated by reference herein in its entirety.

TECHNICAL FIELD

The field of disclosure relates generally to providing rewards, and more particularly to a system and method for providing dynamic rewards based on patron loyalty and present location.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In today's competitive landscape, a casino not only has to contend with other casinos in the area, but also other entertainment venues, both brick and mortar as well as online options, for their share of a customer's discretionary spend. Accordingly, systems and methods for improving customer rewards and thereby customer loyalty are desirable.

BRIEF DESCRIPTION

In some aspects, a loyalty program management system associated with an enterprise location is provided. The loyalty program management system includes a loyalty management server with at least one processor in communication with at least one memory device containing instructions thereon. When executed by the at least one processor the instructions cause the at least one processor to receive a plurality of input data associated with a plurality of patrons. The plurality of input data represents actions of the plurality of patrons. The system also determines a current location of a patron of the plurality of patrons. The current location of the patron is not at the enterprise location. The system then transmits a message to a computer device associated with the patron including a prize to be awarded if the patron visits the enterprise location.

In other aspects, a loyalty program management system associated with an enterprise location is provided. The system includes a loyalty management server including at least one processor in communication with at least one memory device containing instructions thereon. When executed by the at least one processor the instructions cause the at least one processor to store a plurality of promotional campaigns. The system also receives a plurality of input data associated with a plurality of patrons. The plurality of input data represents actions of the plurality of patrons. The system further analyzes the plurality of input data associated with a first patron of the plurality of patrons. From that the system determines one or more promotional campaigns of the plurality of promotional campaigns that the first patron qualifies for. Afterwards, the system generates a personalized promotional campaign for the first patron based on the one or more promotional campaigns.

In still further aspects, a loyalty program management system associated with an enterprise location is provided. The system includes a loyalty management server including at least one processor in communication with at least one memory device containing instructions thereon. When executed by the at least one processor the instructions cause the at least one processor to store a plurality of promotional campaigns. The system also receives a plurality of input data associated with a plurality of patrons. The plurality of input data represents actions of the plurality of patrons. The system further determines that a subset of the plurality of patrons have performed qualifying actions for a first promotional campaign of the plurality of promotional campaigns. Then the system activates the first promotional campaign based on the determination.

DETAILED DESCRIPTION

The present disclosure describes a system and method for leveraging all of the available offerings at a traditional casino resort, as well as those of external affiliated partners. The leveraging is designed to build customer loyalty and spend in whatever venue the customer is located at the time. The disclosure provides a dynamic marketing and promotion system to reward casino patron loyalty for both inside and outside casino gaming and other activity (e.g., online, mobile, social media participation, completed survey) as well as transactions at associated merchants (e.g., casino restaurants, memberships, resorts, online sites, promotional affiliates, etc.).

Figure 1:
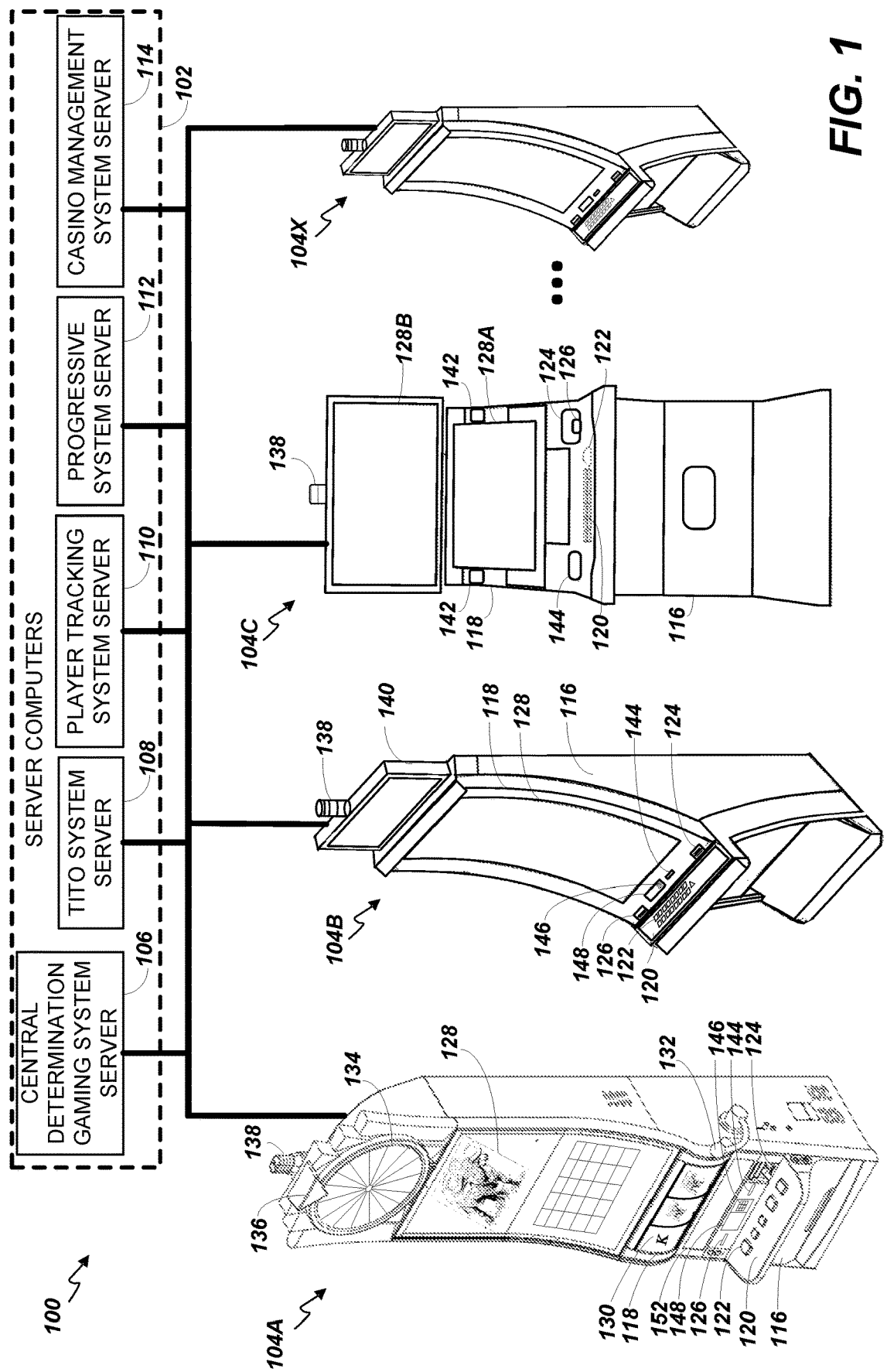
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door (not shown) which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
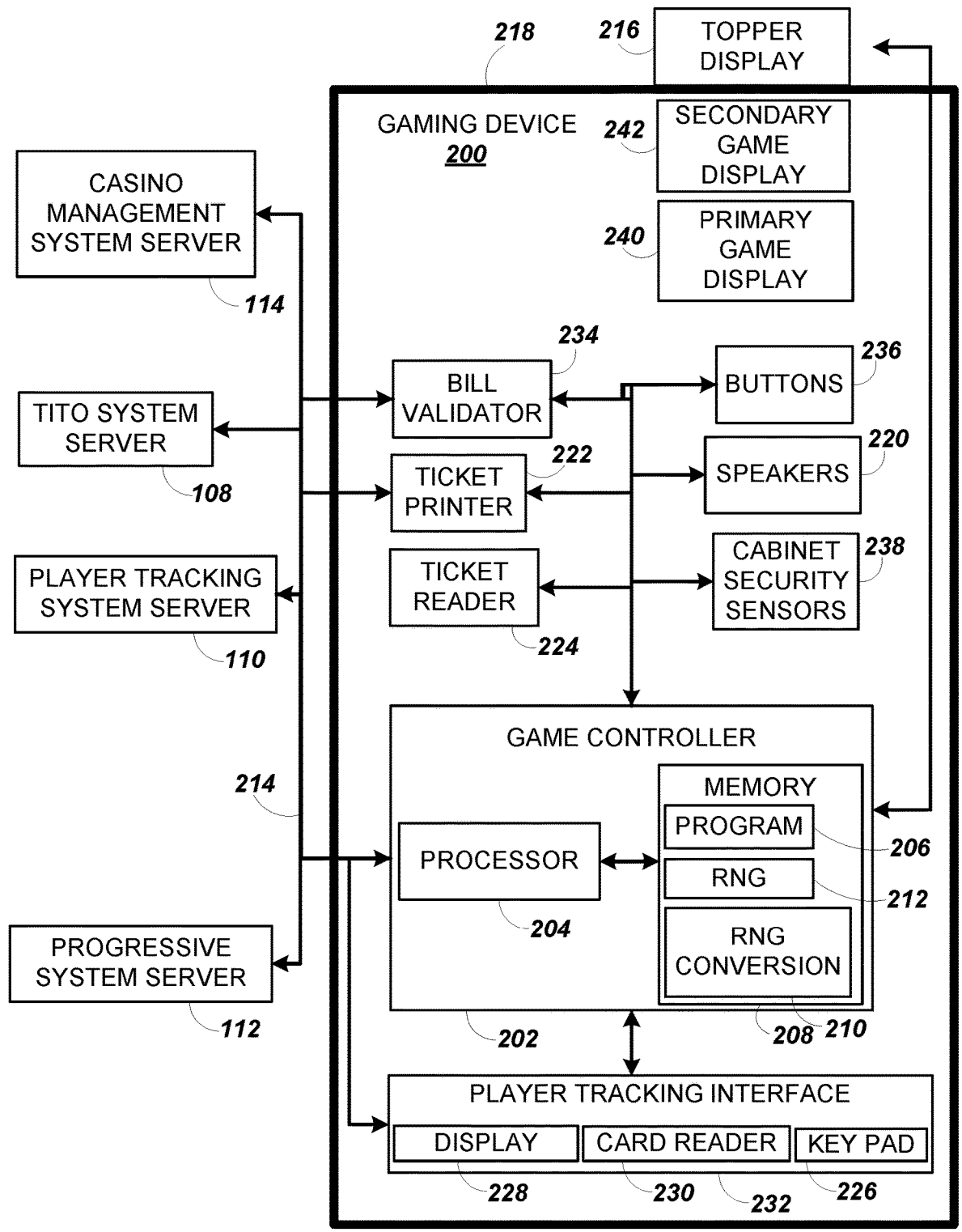
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door (not shown) which opens to provide access to the interior of the gaming device 104B. The main or service door (not shown) is typically used by service personnel to refill the ticket-out printer 126 and collect bills and tickets inserted into the bill validator 124. The main or service door (not shown) may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment.

The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
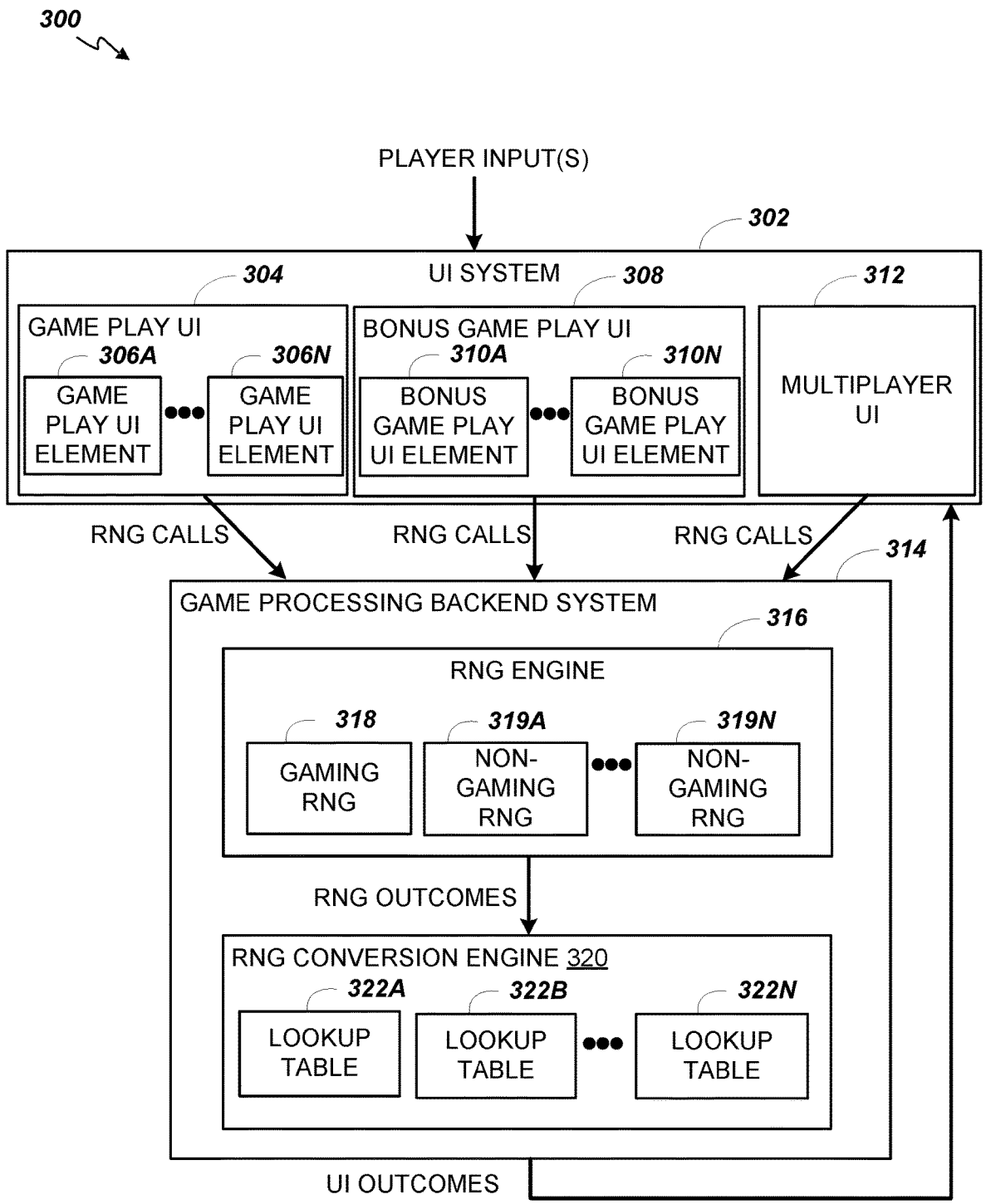
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Figure 4:
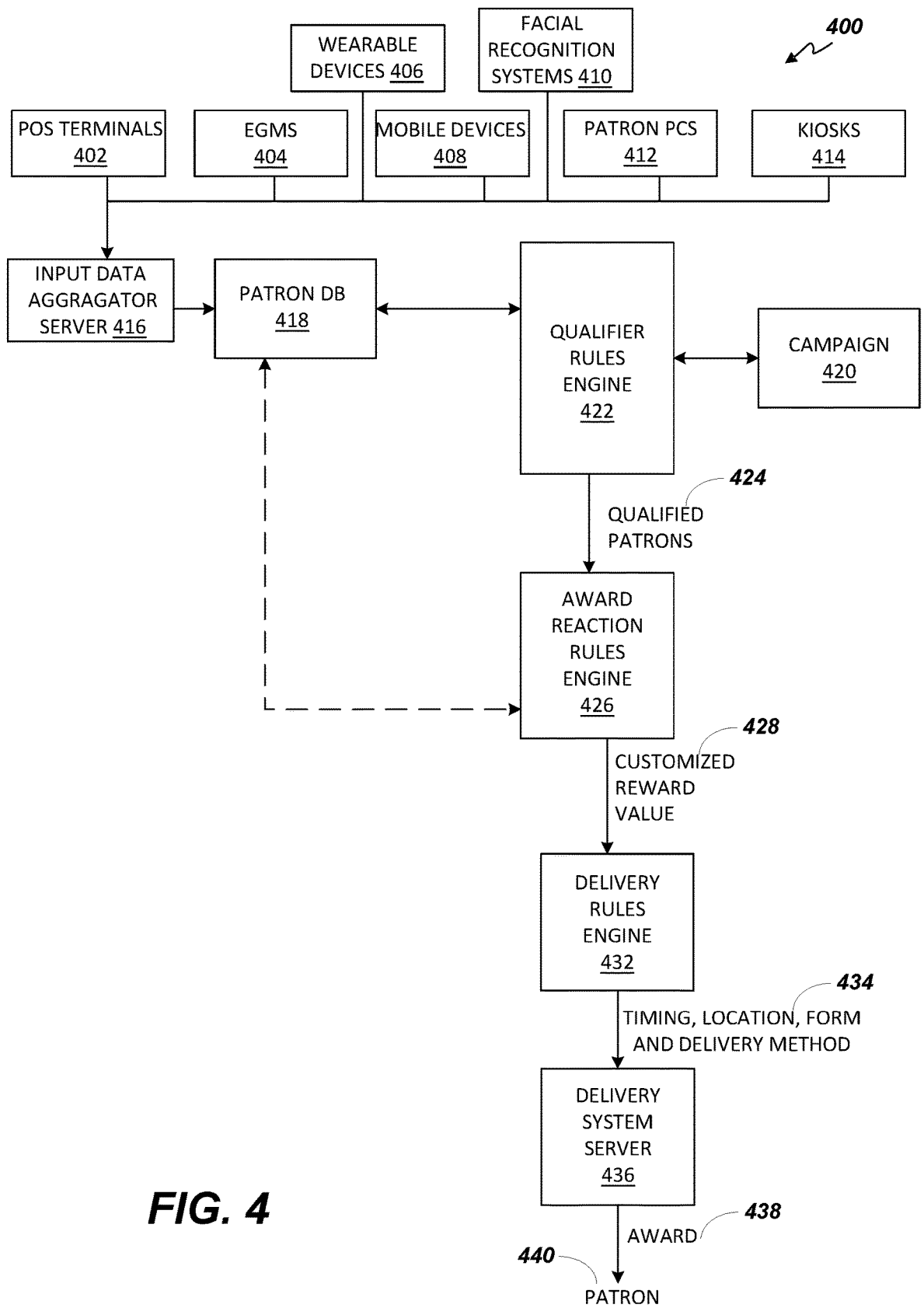
FIG. 4 illustrates a diagram of a loyalty management system in accordance with at least one embodiment described herein.

FIG. 4 is a diagram of an exemplary loyalty management system 400. In some embodiments, the loyalty management system 400 is associated with player tracking system server 110 (shown in FIG. 2). In other embodiments, the loyalty management system 400 is merely in communication with the player tracking system server 110.

In the exemplary embodiment, the loyalty management system 400 includes various input systems, sensors, and devices, such as, but not limited to point of sale terminals 402, EGMs 404, wearable devices 406, mobile devices 408, facial recognition systems 410, patron personal computers 412, public kiosks 414, etc., that provide feeds of input data regarding patron activity to an aggregator server 416 that associates the activities with patrons and stores the information in a patron database 418. A qualifier rules engine 422 that has access to a campaign database 420, scans the patron database 418 to identify patrons 424 that have met the qualifications of a campaign defined by a user and stored in the campaign database 420. The campaigns can be defined to include threshold requirements, such as spend amounts at a casino, at a merchant, at a competitor, physical presence, game play, and other activities. Once a qualified patron 424 is identified that meets the qualifications of a campaign, their information is passed to an award reaction rules engine 426 to determine either a customized reward value 428 or an incentive opportunity or enticement. The reward value 428 is determined based on the qualifying activities, the parameters of the campaign, and other factors. In some embodiments, the historical activities of the patron can also be used to determine the reward value 428. For example, if it is determined that the patron is likely to respond to a particular award or if the patron is within a predetermined comp level, the reward value may be altered from what it might otherwise have been.

If it is determined that an incentive opportunity or enticement is to be presented to the patron, delivery of the opportunity or enticement is affected, and the system 400 returns to monitoring whether the patron has met the award qualifications. If a customized reward value 428 is determined, the value 428 is passed to a delivery rules engine 432 to determine the timing, location, form, and method of delivery 434 of the customized reward value 428. In some embodiments, the delivery rules engine 432 can generate a custom comp currency (with specified rules, restrictions, expirations, and limitation) as the delivery vehicle (i.e., form) for the customized reward value 428. A delivery system server 436 then presents the award 438 to the patron 440.

In the exemplary embodiment, the loyalty management system 400 is configured to expand the loyalty offering for a traditional casino enterprise. The loyalty management system 400 extends the loyalty program from the usual casino and "food and beverage" amenities to include multiple points of engagement with a customer, regardless of the activity or where it takes place. One of the goals of the loyalty management system 400 is to incentivize behaviors in patrons that result in greater affinity for the casino enterprise.

The loyalty management system 400 tracks customer activity at multiple points and turns it into actionable events that can be leveraged in a number of ways. The gamification engine allows for an endless array of promotional events, incented for the customer through achievements that communicate status, and awarded through badges and associated prizes. These achievements and badges are communicated to the customer, such as through electronic messages and the EGMs. The result is an engaging action that keeps the customer focused on achieving goals that are established by the casino, at any venue or activity desired.

In a similar fashion, the loyalty management system 400 provides a loyalty currency to the customer to wrap all customer activity into one loyalty world. The loyalty management system may use the loyalty currency to reward a customer at any venue or for any activity. This loyalty currency may be redeemed by the customer. The loyalty management system 400 may structure the loyalty currency to both incentivize desired behavior, but also to reward customers with redemption possibilities that speak to their needs and desires.

The loyalty management system 400 is configured to engage customers in all meaningful ways and incentivize engagement and loyalty across the entire spectrum of offerings available to the casino, where each offering or reward is customized based on the customer, the customer's past activities, and the customer's current location.

The loyalty management system 400 includes a plurality of components, such as, but not limited to, enterprise connectivity, one or more gamification engines, a loyalty currency, and a digital product suite. The enterprise connectivity refers to the loyalty management system 400 that includes a connection to all points in the enterprise, both on-premise and off, where any customer activity is capable of being tracked. This includes all customer gaming activity, non-gaming spend, visits to all venues and other activity that adds knowledge about a customer's behavior.

The gamification engine tracks badges and achievements to incentivize and reward patrons for desired behavior. Achievements can be based on both gaming and non-gaming activity. Badges are playful ways to indicate to the customer they have accomplished something and are presented to customers at all digital touch points. Achievements indicate thresholds at which badges become visible. The badges slowly become visually complete based on percentage completion of the underlying achievements. Completing badges results in visual notifications. Examples of badges and achievements may be seen in FIG. 5.

Figure 5:
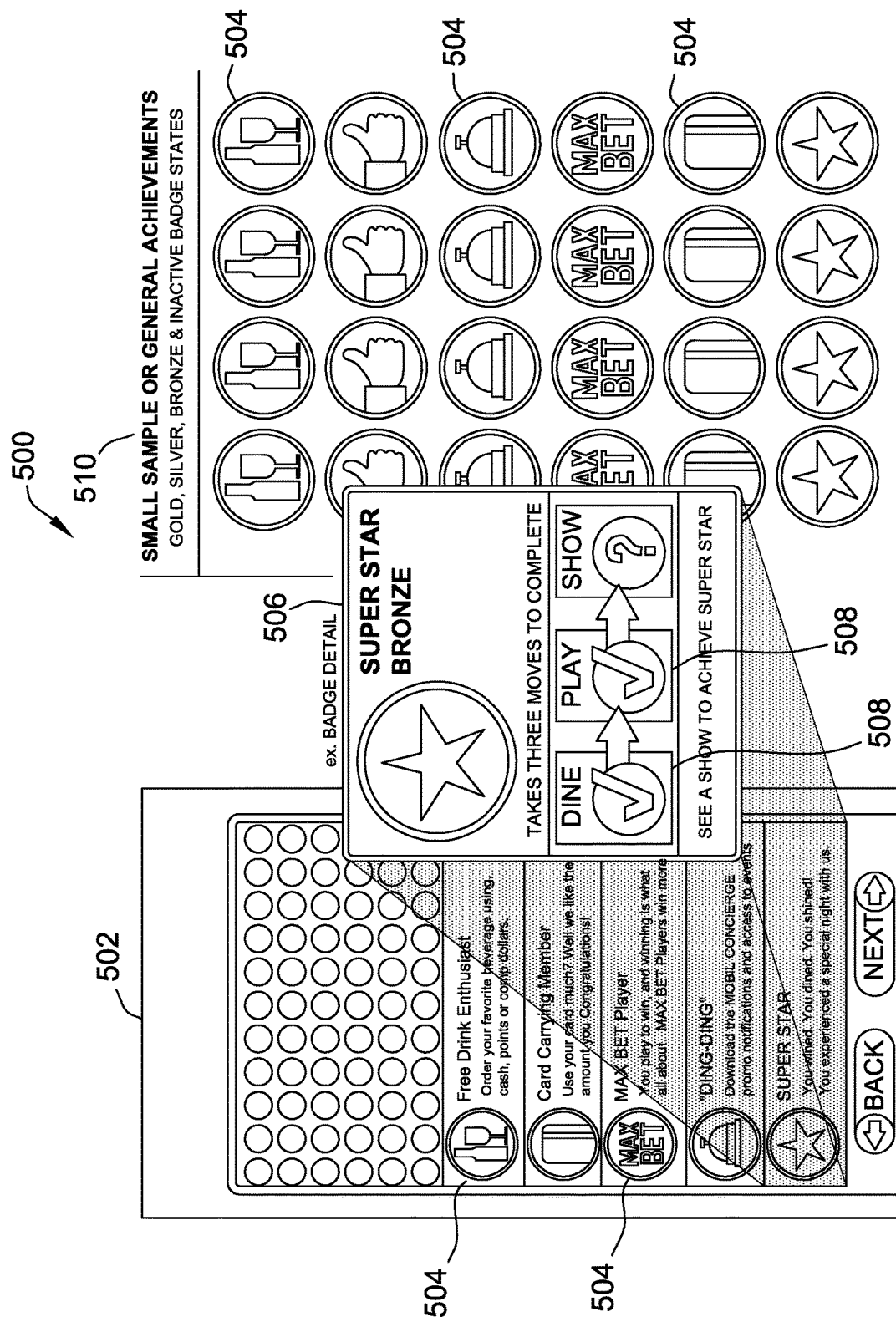
FIG. 5 illustrates two views of a user interface for displaying badges for use by the loyalty management system shown in FIG. 4.

FIG. 5 illustrates two views of a user interface 500 for displaying badges for use by the loyalty management system 400 (shown in FIG. 4). The first view 502 displays multiple different badges 504 that the user may earn. The first view 502 also includes a zoom-in view 506 of the description of a badge 504. More specifically, the zoom-in view 506 displays multiple achievements 508 for the user to earn the badge 504. More specifically, to earn the super bronze star badge 504, the user must perform three tasks, and earn their corresponding achievements 508. These include dining at an onsite restaurant, playing $50 in the casino, and going to a concert or a show. In some embodiments, these achievements 508 must be completed in order. In other embodiments, these achievements 508 may be completed in any order.

The second view 510 displays a plurality different stages for each of a plurality of badges 504. These include gold, silver, bronze, and inactive states for the badges. In some embodiments, the user is able to see all of the inactive or not completed badges. In other embodiments, an inactive badge 504 may only be displayed once the user reaches a specific percentage or portion of the way to completing or earning that badge.

In the exemplary embodiment, the gamification engine is centered around badges 504 that are used to communicate to players status towards reaching milestones and receiving associated prizes. Badges 504 are defined with a variety of criteria that define who can work towards that badge 504. The criteria may include, but is not limited to, customer tier, groups of patrons, gaming and non-gaming activity, and prior earning of other badges 504. Once a player has established that they are eligible to work towards a badge 504, they accumulate activity towards one or more achievements 508 that track the status of defined goals.

This system allows for the creation of extended player sessions with the incentive of achievement and recognition. The system allows for tracking customer spending at non-gaming outlets, setting defined goals for players to achieve badges, tracking of customer comp spend and cash over time, and encouraging player participation in promotions. The system also allows for creating custom badge achievement paths with defined customer behavior. The system also allows customers to earn badges 504 in unexpected ways to increase top of mind awareness.

The loyalty currency is designed to bring together all points of contact within an enterprise, both at the casino and external to it. The loyalty currency can be granted as a reward for earning badges or for other activity. The digital product suite includes a patron user interface that communicates common themes and information to patrons in ways suitable to the media. These may include portal and online games, mobile concierge, free to play games, and other services and systems.

The loyalty management system 400 is configured to improve customer loyalty and incentivize the customer into more and more interaction with the enterprise, regardless of the activity they are engaged on. The loyalty management system 400 tracks food and beverage purchases, gaming, hotel use, retail purchases, entertainment purchase, online game play, and other activities to provide a gamification connection to all potential activities at or around a casino or other location. This system 400 is designed to incentivize customers to visit brick and mortar facilities, to incentivize casino play, to incentivize non-gaming spending, to engage and entertain the customer, and to get insight to the patrons consumption activities on and off property.

The loyalty management system 400 is designed to incentivize the customer to increase their wagering spend, e.g. dollars wagered, in the casino. By connecting all the points of the resort into one loyalty offering, the loyalty management system 400 may also incentivize the customer to increase their non-wagering spend, e.g. goods and services purchased, at the venues of the casino. Wherever the customers is—on casino property or at other venues, at home or on the road—the loyalty management system 400 is configured to provide entertainment to the customer to increase their visitation to the enterprise's many offerings, as well as provide an increase in brand awareness.

By providing more of a one-stop shop for all entertainment options and linking them together into one loyalty offering, the loyalty management system 400 is configured produce an "Us first" mentality in the customer when they consider where and what to do with their entertainment time and money. Additionally, by gaining insight to the patrons consumption activities on and off property, the loyalty management system 400 is enabled to plan and incentivize customer offerings throughout the enterprise eco-system. The loyalty management system 400 is also enabled to provide a valued connection between social gaming engagement and a true Brick and Mortar enterprise.

TABLE 1

| Name | Description |
| --- | --- |
| Loyalty club booth | This is a traditional casino player club booth, staffed with representatives to assist the player. |
| Concierge desk | This is an information desk, but is increasingly offering additional services such as player balance inquiry, reservations and complementary services. |
| VIP desk | This is a variant of the loyalty desk, but typically users are focused on higher-value customers. Since a higher quality of service is expected from the VIP desk, staff typically have additional tools to provide services (non-gaming) such as lodging and miscellaneous reservations (spa, ticketing, golf). Additionally, player performance reporting and other decision-support tools are typically available at the VIP desk. |
| Slot machine | This is a traditional slot machine/EGM, where a player places wagers and interacts with the gaming system. To track play, it is assumed that the EGM will have a card reader or other device for identifying the player (RFID, etc.) |
| Jackpot/Fill workstation | This is a traditional workstation that slot attendants can use to complete paperwork for customer jackpots. As EGMs have shifted towards coinless operation and pressure on staff efficiency increases, the need for dedicated workstations is reducing, and features traditionally handled by a dedicated Jackpot/Fill workstation are shifting towards mobile devices. |
| Table games/Pit | Table games (including Blackjack, Roulette, Craps and a variety of other games). Carded players are rated, in most cases, based on the type of game they are playing, their wagering activity, and the speed of the game. In addition to ratings, this location may also offer complementary services and access to credit lines (markers) and front money (deposits made in advance at the casino cashier/cage). |
| Poker room | A room focused on poker games. Poker differs in that players are typically playing each other instead of playing against the house. Players may be rated on poker gaming and wagering activity and offered complimentary services. |
| Bingo hall | A room focused on the play of Bingo, e.g. the calling of bingo numbers and daubing of bingo cards during the play of a Bingo game. Players can be rated for their play and wagering activity. |
| Race & Sports book | A desk that accepts wagers on sports, race and other activities and events. Carded players can be rated for their gaming and wagering activity. |
| Keno desk | A desk that calls keno numbers. Keno "runners" typically follow a route on the casino floor (announcing "Keno!"), allowing players to place wagers on upcoming rounds of Keno. Players can be rated for their gaming and wagering activity. |
| Casino cashier/cage | Offers check cashing, safe keeping, wire transfers, marker payment services. Players cash out chips at the casino cashier. There is typically also a dedicated window to support floor operations such as table fills/credits. |
| Credit services desk | Typically part of the casino main cashier office, the credit services desk verifies customer credit profile and bank balance(s), and extends a temporary line of credit for use while on-site at the casino. Small resorts may not have a credit services desk, or they may combine its operation with the casino cashier cage. |
| Ticketing desk | This service location allows customers to purchase and pick up, e.g., show and events tickets. |
| Golf/pro shop | This is a specialized retail location focused on golf equipment that may also serve as a golf reservations service desk. It is typical for retail sales to be processed in one system while golf reservations are done in a second system. |
| Bowling/pro shop | This is a specialized retail location focused on bowling equipment that may also serve as a bowling service desk. It is typical for retail sales to be processed in one system while golf reservations are done in a second system. |
| Spa service/salon | This point of service offers spa and salon services, and related product sales. Typically makes use of a specialized scheduling system and retail point-of-sale, sometimes operated by a third party. |
| Poolside services | Increasing in popularity at large resorts, this service combines drink/F&B services, cabana/VIP area rentals, towel services and entertainment. |

TABLE 1-continued

| Name | Description |
|---|---|
| Food & Beverage point-of-sale | This is the cashier station for restaurants and bars. There are several variations on this service, including buffet (where cashiers typically collect payment prior to permitting entrance), cafes and high-end dining (where cashiers typically collect payment after service is rendered), and bar stations. Bar stations have additional variations to support direct customer service (taking and providing drink orders) as well as support for drink servers/runners. Some bars also provide food service. |
| Hotel front-desk | This is a traditional hotel check-in desk. Front desk staff usually focus on checking guests in and out, but are increasingly expected to offer other services including business services (faxing, etc.), package location, and reservations for non-hotel locations (depending on size/scale of a resort). |
| Retail point-of-sale | This is the cashier for retail goods and sundries. Typically, the retail system is separate from the F&B system. Retail POS systems frequently have additional support for inventory tracking and vendor-managed inventory features. |
| Dance and nightclubs | This service location is typically operated by a third party. Typical business is validation of customer age and collecting payment for entrance and drink service. |
| Amusements/arcade | This is traditionally a child's recreation area with coin-operated games. |
| Convention/meeting area | A service which allows groups to rent meeting space for industry/trade conferences. May make use of a specialized scheduling system, as well as digital signage to manage foot traffic. |
| Kiosk | This is typically located on a gaming floor, and is used by customers to look up their balances, promotions, venue maps (wayfinding) and make use of a variety of self-service features. Some kiosks are highly specialized; for example, room check-in, check-out and folio inquiry kiosks (lodging-centric). |
| Third party food service | A variety of third party food services. An example would be a food court with several independent (possibly franchised) food vendors. |
| Third party retail | A variety of third party retail services. An example would be leased retail space such as a mall attached to a gaming venue. |
| Third party services - other | Unspecified third party goods and services. |
| Reservations office | This is a back-of-house function, but many of the features available to a reservations agent are increasingly being handled by VIP hosts and other service points. The Reservations office typically handles booking for hotel room reservations, golf tee times, show tickets, spa booking and other services. Some large-scale operations have dedicated reservations offices for different lines of business. |
| Security and surveillance | Responsible for monitoring gaming activity, loss prevention, and detection of fraud from both customers and employees. |
| Slot operations | Responsible for servicing and provisioning EGMs. |
| Back-of-house - marketing | This office is typically responsible for player performance analysis and promotions and may be responsible for development of advertising materials and strategy, including customer communications. Also may be responsible for measuring promotion performance and oversight of marketing operations, such as the VIP and loyalty club desks. |
| Back-of-house - accounting, finance, audit | These functions include reporting revenue at various outlets, budgeting, capital project financing, ongoing operating expense management, financial reporting, and internal controls. |
| Customer mobile device | This is a customer-controlled mobile device (e.g. a cell phone or tablet). This type of device may use an installed application or mobile web browser to access, e.g., the loyalty system. |
| Public internet website/portal | This is a website operated by a gaming/resort operator. Usually provides contact information, physical location (address), mailing address, employment opportunities and other information to various public consumers. It is a venue for advertising amenities and promotions under direction of the marketing team, and may also include self-service features for reservations and inquiries related to the loyalty club. This may include access to club balance, online gaming, and other features. |
| Third party reservations | Ticket sales and reservations are frequently supported through third-party systems providers that may be linked from the operator's main web site. |
| Third party loyalty integration | A program that allows a customer to earn loyalty rewards by doing business with a partner; alternatively, the gaming operator may allow rewards that are fulfilled through a third |

TABLE 1-continued

| Name | Description |
| --- | --- |
| | party partner. An example would be accrual of loyalty club "currency" through the use of a branded credit card. A second example would be giving a gift certificate to an online store or Brick & Mortar store (e.g., Amazon or Home Depot) as part of the gaming operator's loyalty club rewards program. |
| Social media | A program or feature that recognizes a customer's social media profile(s). An example would be allowing a customer to earn a badge or achievement by 'friending' the gaming operator on Facebook. A second example may involve analysis of a customer's online behavior via the Facebook API (such as their 'likes' of various social elements). |
| Geolocation services | A service which permits a gaming operator to sense and react to the physical location of a customer (geolocation beacons or fences). An example would be to send a solicitation to a customer when they walked by a specific location, either on-site (e.g. on casino property) or offsite (such as at a partner location). |

TABLE 1 includes a plurality of descriptions of potential touchpoints where a customer's activities may be tracked or the customer may incentivized to spend through the loyalty management system 400.

The loyalty management system 400 may award loyalty currency based on any activity that may be tracked and analyzed by a rules engine, such as qualifier rules engine 422. In some embodiments, the loyalty management system 400 may provide the player with one or more bonus awards. As an example, a bonus award could be to grant the player a defined amount of currency. Bonus events can happen throughout the enterprise, including for casino activity, kiosk promotions or other promotions the enterprise may choose to implement.

The loyalty management system 400 may also award loyalty currency for gaming activity in the land based casino. In addition, the loyalty management system 400 may award loyalty currency for online/digital activity and online game play. Specifically, the loyalty management system 400 awards players with currency for visits to the casino's portal or for time spent playing online games. Additionally, there may be rewards for specific behaviors such as referring a friend to the site, and clicking on select links.

The loyalty management system 400 may award loyalty currency based on customer spend on food and beverages, hospitality, or on other premise venues. In some embodiments, the loyalty management system 400 could base the currency award on either achieving specific spend amounts, or as a percentage returned to the customer. Moreover, the loyalty management system 400 may award loyalty currency based on visits to any location within the venue. These visits could be tracked by a mobile app on the customer's mobile device, where the app has geo fencing capability. In some embodiments, achieving a set number or visits to a specific venue, or to a group of venues would then result in the currency award.

Furthermore, the loyalty management system 400 may award loyalty currency based on visits or amounts spent with affiliated businesses external to the enterprise. For example, a casino may have a relationship with a nearby restaurant that will entitle customers to earn currency for spending attributed to the player's card.

The loyalty management system 400 may allow, limit or modify, e.g. increase or decrease, the amounts of loyalty currency which may be earned by a customer depending on a number of customer attributes and behaviors. The loyalty management system 400 may make such modifications based on customer attributes such as: a) tier, historical play, club signup, birthday, and the like; b) the particular venue, activity or event that awarded the currency to the player; c) designated dates and times; d) as the result of bonus events; e) as the result of earning achievements and badges in the gamification engine; and f) any combination of these factors can result in allowing the customer to earn currency. For example, players may be allowed to earn currency based on having already spent a certain amount of their own money in retail outlets—any amount over, e.g., a threshold amount would earn a percentage of currency based on incremental spend. Any combination of these factors may also condition the amount of currency awarded to the player. For instance, higher tier customers could earn currency at a higher rate based on spend than lower tier customers.

The loyalty management system 400 may also allow the customer to redeem loyalty currency at any venue throughout the casino enterprise, as well as affiliated venues outside the traditional casino environment. Some examples include, but are not limited to: a) through slot and other gaming systems for free play, enhanced point earning rates, entry into tournaments and other similar activities; b) at "food and beverage" and hospitality outlets for comp type items, room charges, room upgrades, and similar purchases; and c) at other venues throughout the casino environment for free or reduced prices for purchases at those locations, as a means to secure preferential reservations, or other similar amenities. Examples include spas, bowling alleys, golf courses, retail outlets, theatres and showrooms, etc. In addition, loyalty currency may be redeemed at locations external to the traditional casino environment. For example, loyalty currency earned in the casino could be redeemed for meals at the above-mentioned affiliated restaurant.

Furthermore, the loyalty management system 400 may limit redemption based on one or more factors. These factors may change the redemption rates or, in some cases, not allow the transaction. Examples of factors include, but are not limited to: a) customer attributes such as tier, historical play, club signup, birthday, and the like; b) the particular venue, activity or event that awarded the currency to the player; c) designated dates and times; d) as the result of bonus events; e) as the result of earning achievements and badges in the gamification engine; and f) a required delay before redemption can happen.

The gamification engine is configured to leverage connection points into every available customer touch point to provide unlimited flexibility to influence customer behavior.

In the exemplary embodiment, the gamification engine is centered around badges that are used to communicate to players their status toward reaching milestones and receiving associated prizes. Badges are defined with a variety of criteria that define who can work towards that badge. The criteria may include customer tier, groups of patrons, gaming and non-gaming activity and prior earning of other badges. Once a player has established they are eligible to work towards a badge, they may then accumulate activity toward one or more achievements that track status toward defined goals. At predefined milestones for the achievements, the badge will appear on the customer facing UI and be conditioned to approximate the customer's proximity to reaching the goals associated with the badge. Several options will be provided to customize the display of the customer's progress toward the goals for the badge such as progressively coloring the badge, revealing more of the badge or appearing to peel the badge back to display the underlying image.

Immediately after earning a badge, the loyalty management system 400 may award the player with the badge. This may include colorful celebration through some or all digital communication options—e.g. kiosks, apps, and mobile and online portals. Associated prizes, if any, will be available to the customer upon the award of the badge. The badge will remain in the player's history for a set amount of time before disappearing from the list.

Achievements are the tracking mechanism for player's status toward earning a badge. Achievements are defined with specific goals that are designed to influence customer behavior. Goals can include any activity that is capable of being tracked for a customer, including gaming activity, non-gaming spend or other activity, and visits to specific areas on or off property. All achievements associated with a badge will begin accumulation upon the system determining that the customer is eligible to earn that badge.

Once the threshold has been met to make the badge visible, it will appear to the customer who can click on the badge and see the progress of all associated achievements for that badge. Achievement status can be expressed in several ways, depending on the nature of the goal. Achievement that track separate instances of an activity can be shows as X out of Y target events. Those achievements based on accumulating a set amount of spend or time can be expressed as a percentage toward the goal. Other achievements may simply show a value that represents the customer's current accumulation.

As with achievements, the loyalty management system 400 may include a UI that allows customers to navigate to a list of prizes associated with the earning of a badge. Virtually anything available to the casino may be configured to be used as a prize for badges, including: points and comps, free slot play, free online play and access to additional online content, loyalty currency (both currency itself as well as additional earning and redemption options), prizes, entries into drawings, entries into tournaments, etc.

An example embodiment is if the player plays X dollars in a slot machine each session. For example, the achievement is 50 dollars of coin in. The player may then need to earn the achievement five times in a month. The customer's UI displays the achievement rendered in, for example if the player has earned the achievement three times in the month, three filled in stars out of a possible five. In some embodiments, the customer's UI doesn't display the achievement until the first star is earned. This allows the customer to discover the achievement and gives the appearance of a secret prize. Once all the required achievements are earned within the predetermined period of time, the loyalty management program 400 awards the player with a badge.

Another example embodiment is if the player visits a specific location or set of locations X times within a defined time period. The locations may be a slot machine or any other on or off property location or venue. The player would then see the achievements as they earn them and then would be awarded a badge upon completion.

A further example embodiment is if the player spends a predetermined period of time on a device, such as an EGM. This may include casino slot play or online gaming. The loyalty management system 400 tracks the amount of time spent playing on the device. Once the predetermined period of time is exceeded the player may earn an achievement or a badge. In this embodiment, the achievement may be rendered based on an amount of time spent compared to the required amount of time. In some embodiments, the achievement may not appear until a specific percentage of the goal time has been achieved. In some embodiments, the amount of time is cumulative based on multiple sessions. In some embodiments, different types of gaming may be specifically excluded or included by the loyalty management system 400. For example, slots and video poker may apply, while table gaming does not.

Yet another example embodiment is if the player spends a threshold dollar amount at an individual outlet, such as a retail location, and a "food and beverage" location, entertainment locations, or hospitality location. In this embodiment, the loyalty management system 400 tracks the customer's spending at non-gaming outlets/locations. Once the customer reaches the threshold amount spent, then they earn a badge. The UI for the achievement may render this a dollar amount with a defined goal. The UI might not render the achievement until a certain threshold has been reached. In some embodiments, transactions may have to exceed a predetermined minimum value to count towards the badge. In addition, the thresholds may be based a tier associated with the player, such as a player rewards club tier.

The loyalty management system 400 may use any combination of the above. For example, the loyalty management system 400 may award a badge for when a player has achieved a threshold amount of play on slots, a threshold amount spent in the hotel, and a threshold amount spent on food and beverages. Once the player has achieved, all of the required thresholds, the loyalty management system awards the badge. The UI may show three achievements leading to the badge.

In an additional embodiment, the loyalty management system 400 may track a customer's comp spending and personal wallet spending in non-gaming venues or for a predefined period of time. Once both amounts reach predetermined thresholds, the loyalty management system awards a badge.

In some embodiments, the loyalty management system 400 also receives customer spend using an enterprise linked credit card or wallet. When using the enterprise linked credit card or wallet at a partner location, the customer may receive additional credit, points, and/or loyalty currency based on the transaction. In some embodiments, the loyalty management system 400 tracks the individual customer's use of the enterprise linked credit card or wallet to determine if the customer has become eligible or has been qualified for one or more promotions.

In some embodiments, the loyalty management system 400 may use geofencing to determine that a patron is at a nearby establishment and to entice the patron to visit the enterprise, such as the casino. For example, a patron may be at a partner restaurant or coffeehouse within a mile of the casino. The loyalty management system 400 may determine this through the patron's use of a linked credit card or wallet, a social media check-in, or other activity determined by the input data aggregator server 416. The loyalty management system 400 may determine a customized reward 428 that the patron has qualified for, such as triple points on gaming play for a predetermined period of time. The loyalty management system 400 may send a message to the patron informing them that they will receive triple points on all play for thirty minutes if they come to the casino and begin the play within an hour. The restaurant may be a partner or preferred provider that the casino may recommend. This cross-promotion may allow the loyalty management system 400 to encourage patrons to return to the casino after their meal.

In some other embodiments, the loyalty management system 400 may receive information on the different third-party locations where the patron uses their linked credit card. This allows the qualifier rules engine 422 know which promotions in the campaign database will most likely be responded to by the patron. For example, the qualifier rules engine 422 may determine that the patron likes to shop at a specific hardware store. If that hardware store is a partner of the enterprise, the enterprise may offer rewards associated with that hardware store. Furthermore, the loyalty management system 400 may also determine the effectiveness of the enterprise's partnering based on how much the patrons use the partnered services.

In some embodiments, the loyalty management system 400 may determine that one or more patrons have qualified for a promotion stored in the campaign database 420. The loyalty management system 400 then tracks the number of patrons that have qualified for that promotion within a specific period of time, for example two weeks or a month. If the number of patrons that qualify meets or exceeds a predetermined threshold, then the loyalty management system 400 activates or launches the promotion. The promotion may be tailored to only those that have qualified, or it may be sent to others to allow them to qualify as well. For example, if the loyalty management system 400 tracks the number of patrons that have spent over a predetermined threshold at a specific partnered store; once the predetermined number of patrons have qualified by shopping at that store, then the loyalty management system 400 activates a promotion associated with that particular store. For example, earn a gift from that store if you visit the casino within a specific period of time, such as, within ten or thirty days.

In some further embodiments, the loyalty management system 400 may combine the qualifications from multiple partners to build a larger promotion, where the patrons may choose from prizes at any of those partners. In some embodiments, the prize may be provided via an online loyalty mall, where the patron may select a prize from a selection of prizes, e.g., of equivalent prize values.

In the exemplary embodiment, the loyalty currency may be spent for gameplay and non-gaming purchases. In some embodiments, the loyalty currency may have different values based on how or where it is being spent. For example, if a player wanted to spend the loyalty currency on food at a location on the casino property, the loyalty currency may be spent so that a first amount of the currency may be equal to a specific amount of money. If the player was spending the currency for food at a location separate from but, e.g., affiliated with the casino, the amount of currency required to equal that same amount of money may be higher. In some embodiments, different locations and/or activities have different multipliers for determining the monetary value when spending the loyalty currency. In addition, spending loyalty currency at different times, may change the multipliers.

In some embodiments, there may be multipliers applied to earning the loyalty currency, where the amount earned or the amount credited towards an award is based on at least one of the amount wagered and the tier of the player. In these embodiments, players may be sorted into tiers, such as based on loyalty program tiers. In some embodiments, the bet amount and the tier of the player may affect the amount of points or credit earned towards loyalty currency or a badge. For example, if a player in the platinum tier plays in the $25-$49 wagering range, then the player's loyalty currency earnings may be multiplied by a first multiplier, while a gold tier player's earnings may be multiplied by a second multiplier. In some embodiments, the player needs to qualify for the multiplier by meeting additional criteria as set in the loyalty management system 400.

In the exemplary embodiment, the loyalty management system 400 is configured to allow an administrator to set thresholds, badges, awards earned, weights, and other attributes of the system. The loyalty management system 400 allows the administrator to build new rules. In addition, the loyalty management system 400 may be configured to allow a supervisor to review and approve any rule or setting prior to allowing the rule or setting to be applied to a player. Administrators and/or supervisors may review active rules and settings and adjust or remove the rules and settings.

In the exemplary embodiment, the loyalty management system 400 is configured to store player information including attributes of a plurality of players. These attributes may include information such as, but not limited to, name, current loyalty currency, loyalty program tier, and progress towards badges and other goals. The loyalty management system 400 in also configured to receive player activity information from a plurality of sources, wherein the player activity information includes gaming activity and non-gaming activity. For a player of the plurality of players, the loyalty management system 400 determines an amount of a loyalty currency to award to the player based on the player activity information associated with the player. In addition, the loyalty management system 400 receives from the player a request for a transaction to spend some of the amount of the loyalty currency, wherein the request includes a location associated with the transaction. The loyalty management system 400 then determines a value of the loyalty currency based on the location of the transaction. For example, the value of the loyalty currency may change if the transaction is for food and beverage at the casino, or for gaming activities at the casino, or for gaming activities online, or for retail purchases.

In the exemplary embodiment, the loyalty management system 400 receives a plurality of input data associated with a plurality of patrons. The plurality of input data represents actions of the plurality of patrons. The loyalty management system 400 determines a current location of a patron of the plurality of patrons. In these embodiments, the current location of the patron is not at the enterprise location. The loyalty management system 400 transmits a message to a computer device associated with the patron including a prize to be awarded if the patron visits the enterprise location.

In some embodiments, the current location of the patron is within a predetermined distance of the enterprise location. In some other embodiments, the current location of the patron is at a partner merchant location associated with the enterprise location. In still further embodiments, the prize is to be awarded if the patron visits the enterprise location within a predetermined period of time. In other embodiments, the current location of the patron is determined based on a transaction performed by the patron with a merchant or a social media action performed by the patron. In some embodiments, the loyalty management system 400 determines that the patron visited the enterprise location within a predetermined period of time prior to the present time as a part of the determination to transmit the prize to the patron.

In the exemplary embodiment, the loyalty management system 400 stores a plurality of promotional campaigns, such as in campaign database 420. The loyalty management system 400 receives a plurality of input data associated with a plurality of patrons. The plurality of input data represents actions of the plurality of patrons. The loyalty management system 400 determines that a subset of the plurality of patrons have performed one or more qualifying actions for a first promotional campaign of the plurality of promotional campaigns. Then the loyalty management system 400 activates the first promotional campaign based on the determination. In some embodiments, the loyalty management system 400 compares each of the plurality of actions to the plurality of promotions to determine if any of the actions are qualifying actions.

In some embodiments, the one or more qualifying actions include performing a transaction at a partner merchant. The qualifying action may include the transaction exceeding a predetermined amount. In some further embodiments, the first promotional campaign is associated with the partner merchant. In some additional embodiments, the subset of patrons performed the one or more qualifying actions within a predetermined period of time. In still further embodiments, the first promotional campaign awards a prize for qualifying patrons visiting the enterprise location.

In the exemplary embodiment, the loyalty program management system 400 stores a plurality of promotional campaigns, such as in campaign database 420. The loyalty program management system 400 receives a plurality of input data associated with a plurality of patrons. The plurality of input data represents actions of the plurality of patrons. The loyalty program management system 400 analyzes the plurality of input data associated with a first patron of the plurality of patrons. The loyalty program management system 400 determines one or more promotional campaigns of the plurality of promotional campaigns that the first patron qualifies for based on the analysis. The loyalty program management system 400 generates a personalized promotional campaign for the first patron based on the one or more promotional campaigns.

In some embodiments, the plurality of input data associated with the first patron includes a plurality of transactions at merchants located at the enterprise location and/or transactions at merchants located remote from the enterprise location. In additional embodiments, the personalized promotional campaign includes a prize chosen specifically for the first patron. In further embodiments, the personalized promotional campaign includes a plurality of actions for the first patron to perform to earn the prize.

In some embodiments, the loyalty program management system 400 transmits one or messages to a user computer device associated with the first patron including information to be displayed to the first patron about the personalized promotional campaign. In further embodiments, the loyalty program management system 400 transmits instructions to the user computer device associated with the first patron to display information about the first patron's progress in the personalized promotional campaign.

Accordingly, technical effects and technical improvements associated with the electronic gaming systems and methods described herein include, but are not limited to, the following: (i) providing unique incentive and rewards programs, which may be based upon any of a variety of player or user actions, such as placing transactions at an enterprise merchant (e.g., a casino) and/or any partner merchants that are voluntarily affiliated with the enterprise merchant; (ii) rewarding players for placing transactions with partner merchants, (iii) incentivizing players to return to the enterprise merchant following completion of one or more transactions at partner merchant locations; (iv) creating and customizing prizes tailored to individual players based upon individual player actions and other player profile information; (v) creating and customizing promotional campaigns for individual players that include a variety of further actions or assignments, which if achieved, may lead to additional prizes and incentives; (vi) a variety of additional marketing and incentive strategies, including for example, creation of badges and other marketing campaigns; (vii) implementation of the unique and additional marketing campaigns, as described herein, across a wide spectrum of enterprise locations and enterprise businesses (e.g., casino games, restaurants, spas, golf courses, etc.) and partner locations to facilitate and enable implementation of marketing campaigns that allow players to accrue rewards, monetary value, and other prizes for a large array of spending and other activities, (viii) providing loyalty currency, which may be redeemed for gaming and non-gaming products and services, to a player based upon any of a variety of player actions, such as player transactions conducted within an enterprise location and/or at one or more partner locations, (viii) transmitting one or more messages to a computer device of a player, such as a smartphone, notifying the player that loyalty currency has been awarded, and in some cases, a time period prior to expiration of the loyalty currency, (ix) enabling redemption of the loyalty currency at the enterprise or a partner location prior to the expiration of the time period, if any, and (x) applying one or more multiplication factors to an awarded loyalty currency based upon a variety of conditions, such as location and time conditions as well as, in some cases, one or more player attributes.

Further, although the systems and methods are, in some embodiments, described herein in association with wagering games, it will be appreciated that these systems and methods may be equally implemented in conjunction with non-wagering games and/or wagering games that do not utilize a monetary currency. Moreover, in many implementations, the marketing campaigns and other rewards and incentive strategies may be implemented with or without traditional casino wagering aspects, such as, for example, in conjunction with a resort-style enterprise location (e.g., a hotel and resort) that offers a variety of amenities and activities but which may or may not offer casino wagering as well.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming system comprising:
   at least one memory with instructions stored thereon; and
   at least one processor in communication with the at least one memory, wherein the instructions, when executed by the at least one processor, cause the at least one processor to:
   determine a plurality of target locations for a patron account;
   determine, based on an input of location data received by an input data aggregator server, a current location of a patron associated with the patron account based on the location data associated with the patron account;
   cause the current location to be included in the plurality of target locations;
   determine a plurality of target conditions for the patron account, wherein the plurality of target conditions comprise a respective transaction associated with the patron account at each of the target locations, wherein a first target condition of the plurality of target conditions is associated with the current location and is customized for the patron account based at least in part on the location data, and wherein when the plurality of target conditions are achieved, an achievement output is provided to the patron account;
   cause a graphical user interface (GUI) to be displayed at a patron device associated with the patron account, wherein the GUI includes a plurality of icons each associated with a respective target condition of the plurality of target conditions;
   determine, based on an input of transaction data associated with the current location and received by the input data aggregator server, that the first target condition is achieved based on the transaction data associated with the current location of the plurality of target locations and the patron account;
   cause the icon associated with the first target condition to be updated at the GUI to indicate that the first target condition has been achieved;
   determine, based on an input of transaction data associated with the last remaining target location of the plurality of target locations and received by the input data aggregator server, that a last remaining target condition of the plurality of target conditions is achieved based on the transaction data associated with the last remaining target location and the patron account;
   cause the icon associated with the last remaining target condition to be updated at the GUI to indicate that the last remaining target condition has been achieved; and
   cause the achievement output to be provided to the patron account by a delivery system server and based on the last remaining target condition being achieved.

2. The electronic gaming system of claim 1, wherein the instructions further cause the at least one processor to:
   determine an order in which the plurality of target conditions need to be achieved in order for the achievement output to be provided; and
   cause the plurality of icons to be displayed corresponding to the order in which the plurality of target conditions need to be achieved in order for the achievement output to be provided.

3. The electronic gaming system of claim 2, wherein the instructions further cause the at least one processor to cause the icon associated with the last remaining target condition to be updated at the GUI to indicate that the last remaining target condition has been achieved only when the last remaining target condition is achieved after every other target condition of the plurality of target conditions.

4. The electronic gaming system of claim 1, wherein the first target condition is associated with a first amount of spend at the current location, and wherein the instructions further cause the at least one processor to determine that the first target condition is achieved based on the transaction data satisfying the first amount of spend for the patron account at the current location.

5. The electronic gaming system of claim 1, wherein the instructions further cause the at least one processor to cause the icon associated with the first target condition to be updated by at least one of causing a color of the icon associated with the first target condition to change or causing an underlying image behind the icon associated with the first target condition to be revealed.

6. The electronic gaming system of claim 1, wherein the instructions further cause the at least one processor to cause display of an amount of progress toward the achievement output being provided on the GUI.

7. The electronic gaming system of claim 1, wherein the instructions further cause the at least one processor to determine the achievement output based at least in part upon electronic gaming data associated with the patron account.

8. The electronic gaming system of claim 1, wherein the plurality of target locations includes at least one of a retail location, a food and beverage location, an entertainment location, or a hospitality location.

9. The electronic gaming system of claim 1, wherein the location data is received by the input data aggregator server from at least one of a geolocation device associated with a geofence or a mobile device associated with the patron account.

10. The electronic gaming system of claim 1, further comprising the input data aggregator server and the delivery system server, wherein the input data aggregator server and the delivery system server are one of a same server or a different server.

11. At least one non-transitory computer-readable storage medium with instructions stored thereon that, in response to execution by at least one processor, cause the at least one processor to:
   identify a plurality of target locations for a patron account;
   identify, in response to an input of location data received by an input data aggregator server, a current location of a patron associated with the patron account based on the location data associated with the patron account;
   cause the current location to be included in the plurality of target locations;
   identify a plurality of target conditions for the patron account, wherein the plurality of target conditions comprise a respective transaction associated with the patron account at each of the target locations, wherein a first target condition of the plurality of target conditions is associated with the current location and is customized for the patron account based at least in part on the location data, and wherein when the plurality of target conditions are achieved, an achievement output is provided to the patron account;

cause display of a graphical user interface (GUI) at a patron device associated with the patron account, wherein the GUI comprises a plurality of indicators each associated with a respective target condition of the plurality of target conditions;

identify, in response to an input of transaction data associated with the current location and received by the input data aggregator server, that the first target condition of the plurality of target conditions is achieved based on the transaction data associated with the current location of the plurality of target locations and the patron account;

cause display of the indicator associated with the first target condition to be updated at the GUI to indicate that the first target condition has been satisfied;

identify, in response to an input of transaction data associated with the last remaining target location of the plurality of target locations and received by the input data aggregator server, that a last remaining target condition of the plurality of target conditions is satisfied based on the transaction data associated with the last remaining target location and the patron account;

cause display of the indicator associated with the last remaining target condition to be updated at the GUI to indicate that the last remaining target condition has been satisfied; and control the achievement output to be provided to the patron account by a delivery system server and in response to the last remaining target condition being achieved.

12. The at least one non-transitory computer-readable storage medium of claim 11, wherein the instructions further cause the at least one processor to:
identify an order in which the plurality of target conditions should be achieved in order for the achievement output to be provided; and
cause display of the plurality of indicators corresponding to the order in which the plurality of target conditions should be achieved in order for the achievement output to be provided.

13. The at least one non-transitory computer-readable storage medium of claim 12, wherein the instructions further cause the at least one processor to cause display of the indicator associated with the last remaining target condition to be updated at the GUI to indicate that the last remaining target condition has been satisfied only when the last remaining target condition is satisfied after every other target condition of the plurality of target conditions.

14. The at least one non-transitory computer-readable storage medium of claim 11, wherein the first target condition is associated with a first spend amount at the current location, wherein the instructions further cause the at least one processor to determine that the first target condition is satisfied based on the transaction data satisfying the first spend amount for the patron account at the current location.

15. The at least one non-transitory computer-readable storage medium of claim 11, wherein the instructions further cause the at least one processor to cause display of the indicator associated with the first target condition to be updated by at least one of causing a color of the indicator associated with the first target condition to change or causing an underlying image behind the indicator associated with the first target condition to be revealed.

16. The at least one non-transitory computer-readable storage medium of claim 11, wherein the instructions further cause the at least one processor to cause display of an amount of progress toward the achievement output being provided at the GUI.

17. The at least one non-transitory computer-readable storage medium of claim 11, wherein the instructions further cause the at least one processor to identify the achievement output based at least in part upon electronic gaming data associated with the patron account.

18. The at least one non-transitory computer-readable storage medium of claim 11, wherein the plurality of target locations includes at least one of a retail location, a food and beverage location, an entertainment location, or a hospitality location.

19. A method of providing a graphical user interface (GUI) for achievement tracking implemented by at least one processor in communication with at least one memory, the method comprising:
selecting a plurality of target locations for a patron account;
determining, based on an input of location data received by an input data aggregator server, a current location of a patron associated with the patron account based on the location data associated with the patron account;
selecting the current location as one of the plurality of target locations;
selecting a plurality of target conditions for the patron account, wherein the plurality of target conditions comprise a respective transaction associated with the patron account at each of the target locations, wherein a first target condition of the plurality of target conditions is associated with the current location and is customized for the patron account based at least in part on the location data, and wherein when the plurality of target conditions are achieved, an achievement output is provided to the patron account;
controlling the GUI to be displayed at a patron device associated with the patron account, wherein the GUI includes a plurality of icons each associated with a respective target condition of the plurality of target conditions;
determining, based on an input of transaction data associated with the current location and received by the input data aggregator server, that the first target condition of the plurality of target conditions is achieved based on the transaction data associated with the current location of the plurality of target locations and the patron account;
controlling the icon associated with the first target condition to be updated at the GUI to indicate that the first target condition has been achieved;
determining, based on an input of transaction data associated with the last remaining target location of the plurality of target locations and received by the input data aggregator server, that a last remaining target condition of the plurality of target conditions is achieved based on the transaction data associated with the last remaining target location and the patron account;
controlling the icon associated with the last remaining target condition to be updated at the GUI to indicate that the last remaining target condition has been achieved; and
controlling the achievement output to be provided to the patron account by a delivery system server and based on the last remaining target condition being achieved.

20. The method of claim 19, further comprising:
selecting an order in which the plurality of target conditions need to be achieved in order for the achievement output to be provided; and
controlling the plurality of icons to be displayed corresponding to the order in which the plurality of target conditions need to be achieved in order for the achievement output to be provided.

\* \* \* \* \*